United States Patent [19]

Edwards

[11] 4,393,493
[45] Jul. 12, 1983

[54] AUTOMATIC PROTECTION APPARATUS FOR SPAN LINES EMPLOYED IN HIGH SPEED DIGITAL SYSTEMS

[75] Inventor: Allan K. Edwards, Raleigh, N.C.

[73] Assignee: International Telephone and Telegraph Corporation, New York, N.Y.

[21] Appl. No.: 205,133

[22] Filed: Nov. 10, 1980

[51] Int. Cl.³ .............................. H04J 3/12; H04J 3/14
[52] U.S. Cl. .................................. 370/16; 370/110.4; 371/49; 179/175.3 S; 340/825.01
[58] Field of Search ................... 370/16, 110.4, 110.1; 371/49; 179/175.3 S; 340/825.01, 825.5

[56] References Cited

U.S. PATENT DOCUMENTS

| | | |
|---|---|---|
| 3,364,468 | 1/1968 | Haibt et al. .................... 179/175.3 S |
| 3,457,373 | 7/1969 | Van Duuren et al. ............... 370/16 |
| 3,715,503 | 2/1973 | Jungbluth et al. ................ 370/16 |
| 3,864,533 | 2/1975 | Erlund ......................... 179/175.3 S |
| 3,922,495 | 11/1975 | Donohoe ........................ 370/110.4 |
| 3,983,340 | 9/1976 | Lima et al. .................... 179/175.3 S |
| 4,261,054 | 4/1981 | Scharla-Nielsen ................ 370/110.4 |

FOREIGN PATENT DOCUMENTS 2039447  8/1980  United Kingdom ............. 370/110.4

OTHER PUBLICATIONS

"A Digital Transmission Line Switching System", by Takashima et al., Japan Telecommunications Review, Apr. 1980, vol. 22, No. 2, pp. 127–134.

Primary Examiner—Douglas W. Olms
Attorney, Agent, or Firm—John T. O'Halloran; Alfred C. Hill

[57] ABSTRACT

An automatic span line switch for high speed communication lines is disclosed. The apparatus employs an alarm interface unit which is coupled to a service line terminal in order to detect a line failure mode. Upon detection of such a mode, the system operates to modify the parity bit content of the transmitted digital signal in order to provide a unique code to be transmitted to a remote office connected to a near office and indicative of a span line failure. The apparatus automatically proceeds to switch the failed transmission line to a back-up protection line to enable the near location to communicate with the remote location via the back-up line. All control signals transmitted between the locations are implemented by means of unique codes which are generated by purposely modifying the parity bit content in each successive frame of the transmitted digital signal. The system further describes a priority system for preferentially switching higher priority service lines when multiple failures occur. Various other techniques such as manual operation are disclosed to enable manual switching of protection lines during system operation.

24 Claims, 31 Drawing Figures

LEGEND FOR FIGS 8 TO 19

101010 —•—•—•—•—•—•— "KEEPALIVE" SIGNAL
ACTIVE CONTROL
CODE I  — — — — — —  & DATA SIGNALS
(FIG. 20)

DATA
(DS3 INHIBIT  • • • • • • • • • • •

CROSS
HATCH  ▧▧▧▧▧

AVAILABLE CODE WORDS

| CODE NUMBER | CODE WORD $B_7 \rightarrow B_0$ | | CODE NUMBER | CODE WORD $B_7 \rightarrow B_0$ | |
|---|---|---|---|---|---|
| 1  | 0101 | 0101 | 17 | 0010 | 0101 |
| 2  | 0011 | 0011 | 18 | 0001 | 0111 |
| 3  | 0111 | 0111 | 19 | 0010 | 0111 |
| 4  | 0001 | 0001 | 20 | 0100 | 0111 |
| 5  | 0000 | 1111 | 21 | 0001 | 1011 |
| 6  | 0000 | 1001 | 22 | 0101 | 1011 |
| 7  | 0000 | 0011 | 23 | 0001 | 1011 |
| 8  | 0011 | 1111 | 24 | 0001 | 0011 |
| 9  | 0010 | 1011 | 25 | 0010 | 1111 |
| 10 | 0000 | 0101 | 26 | 0011 | 1111 |
| 11 | 0000 | 0111 | 27 | 0011 | 0111 |
| 12 | 0000 | 1011 | 28 | 0101 | 0111 |
| 13 | 0001 | 0011 | 29 | 0101 | 1011 |
| 14 | 0010 | 0011 | 30 | 0101 | 1111 |
| 15 | 0100 | 0011 | 31 | 0110 | 1111 |
| 16 | 0001 | 0101 | 32 | 0110 | 1111 |

FIG. 20

AUTOMATIC PROTECTION APPARATUS FOR SPAN LINES EMPLOYED IN HIGH SPEED DIGITAL SYSTEMS

BACKGROUND OF THE INVENTION

The use of automatic protection switching in the field of telecommunication transmission is employed as a means of reducing the out of service time where signals must be transmitted over span lines, which lines include repeater amplifiers. In telephone systems, communication occurs over pulse code modulated (PCM) transmission lines which may multiplex a number of terminals onto a common PCM channel. Accordingly, in such systems, communications between central offices occur over span lines which essentially consist of multiwire cables containing repeating amplifiers at intervals. The main function of such span lines is to maintain the data within acceptable amplitudes during transmission between offices.

It is, of course, possible that a span line or a repeater contained in such a line exhibits a failure and hence, the line becomes inoperative. Therefore, the prior art has determined that it is desirable to switch a defective span line to an operative span line in order to maintain communications. As indicated, such an interruption in transmission line due to outside equipment failure or cable breakage is thus avoided by automatic transfer of the signal to a working spare line.

The prior art has been cognizant of such problems and has employed systems which operate to monitor the quality of the signal and to provide automatic transfer to a spare line upon detection of signal degradation. Upon removal of a fault condition, the data would then be transferred back to the original line.

For an example of such prior art techniques, reference is made to U.S. Pat. No. 3,715,503 entitled AUTOMATIC TRANSFER ARRANGEMENT FOR A TELEPHONE SYSTEM issued in February, 1973 to Jungbluth et al.

In any event, with the increasing demand for high speed operation which is attendant with high frequency of transmission, the information capacity is much greater and hence increased reliability is necessary in order to operate such systems in a reliable and efficient manner. Therefore, the need for protective switching in regard to span lines becomes even more important. However, if one employs the lower frequency schemes of the prior art, the protection apparatus becomes extremely expensive while consuming a great deal of power. Accordingly, it is necessary to provide an alternative approach for high speed operation.

In particular, a modern day system may employ, as a transmission medium, optical fibers coupled to and which operate with suitable optical transmitters and receivers and which function as span lines. As a transmission medium, optical fibers have a number of unique advantages when compared with the conventional conductors. In regard to such advantages, is the ability to provide a system with a low total cost. In implementing such systems, only one fiber is required per direction of transmission. Hence, this feature makes optical fibers attractive for use in crowded ducts. Furthermore, terminals and/or repeaters can be spaced at greater intervals because of the reduced signal attenuation/degradation in optical fibers. In this manner, the attenuation per unit length of optical fibers allows a longer repeater spacing than that employed in coaxial cables. In present day systems, such repeaters can be spaced between four to five miles or six to eight kilometers apart. In view of progress being made in present technology, the performance of such optical fibers will probably improve in the future and allow even greater spacing.

The optical fiber further permits reduced system cost based on its wide band width, low attenuation and the attendant reduction of cable size. Presently graded index fibers as manufactured by the Assignee herein can operate at bit rates varying from 1.544 Mb/s to 44.736 Mb/s. In fiber communications, there is also a virtual absence of crosstalk and hence, systems of various bit rates may be mixed in the same optical fiber cable. The fibers are completely immune to all forms of electrostatic or electromagnetic interference and are virtually unaffected by moisture, while providing a great deal of system security.

In any event, in employing such fibers in an optimum way, one must face various problems which are associated with fiber use. At the high frequencies of transmission, fiber optical systems typically employ single fibers as the transmission medium and a laser diode as the light source. Since it is difficult to transmit multilevel signs using laser sources, a binary signal is normally sent. Unless there are error check bits built into the frame format of the signal, there is no facility for in-traffic line error monitoring and therefore the line signal frequency must be increased to include the extra bits for error detection.

It is therefore an object of the present invention to provide an automatic protection switch for a span line employed in a high speed digital system, which system may include optical fiber span lines. It is a further object of this invention to modify the parity bit content in such a system to obtain in-traffic bit error rate monitoring and to further use those bits for bit error purposes to enable control of a protection switch for a span line.

BRIEF DESCRIPTION OF THE PREFERRED EMBODIMENT

Automatic protection apparatus for a telecommunications system including at least one service line terminal associated with a service line and at least one protection line terminal associated with a protection line, with said service and protection lines extending between a near telecommunications office to a far telecommunications office for transmitting between said office digital data indicative of information, with said data as transmitted comprising a number of successive data frames, wherein each frame has a plurality of data bits and at least one parity bit indicative of the count of said data bits being even or odd, comprising monitoring means for sensing a failure of service line between said near and far offices, parity code inserting means coupled to said monitoring means and operative to modify said parity bit from frame to frame to indicate said failure, switching means responsive to said frames of data as modified in parity by said code inserting means for transferring at said near and far end said telecommunications service line to said protection line upon sensing said failure according to said parity bit modification, and control generation means coupled to said parity code inserting means for further modifying said parity bit as transmitted to enable said near and far end to communicate to provide indications necessary to fully complete said transfer.

BRIEF DESCRIPTION OF THE DRAWINGS

FIG. 8 depicts a new end service line terminal under normal traffic conditions;

FIG. 9 depicts a near end line terminal when detecting a major alarm condition;

FIG. 10 depicts a near end line terminal generating a transfer request;

FIG. 11 depicts a near end line terminal implementing a first step in the transfer;

FIG. 12 depicts a near end line terminal implementing a second step in the transfer;

FIG. 13 depicts a near end line terminal implementing a transfer at the near end;

FIG. 14 depicts a near end line terminal proceeding with transfer at the near end;

FIG. 15 depicts the transfer sequence which is repeated at the far end to provide an end to end transfer;

FIG. 16 depicts a reset at the near end after a transfer;

FIG. 17 depicts a completion of the reset at the near end after a transfer;

FIG. 18 depicts a completed transfer at both ends and acknowledgement;

FIG. 19 depicts the remaining step in completing a transfer between the near and far end;

FIG. 20 depicts a table of eight bit cyclical code words which are available according to this invention;

DETAILED DESCRIPTION OF THE INVENTION

Figure 1:
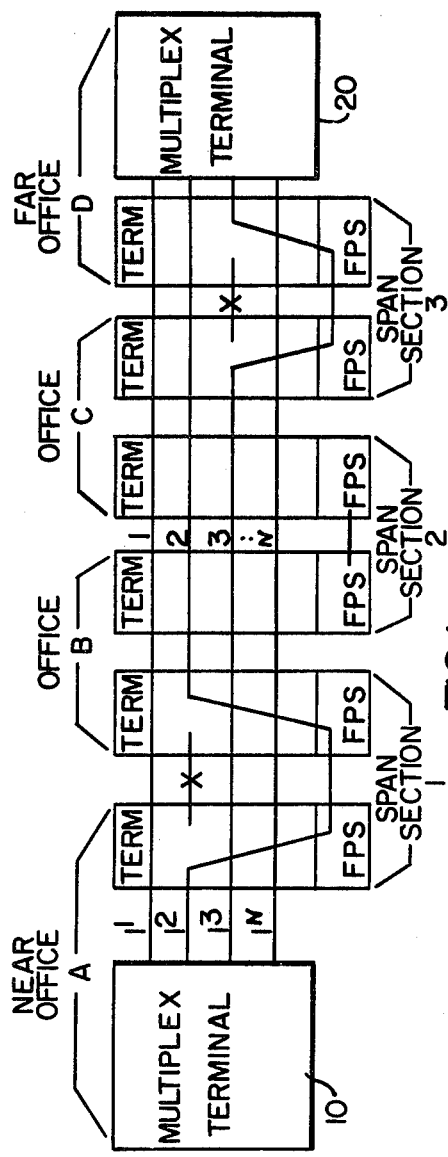
FIG. 1 is a simple block diagram showing optical service lines protected by a protection line according to this invention.

Referring to FIG. 1, there is depicted a simplified block diagram showing the environment in which this invention operates. FIG. 1 shows a number of telephone offices designated as A,B,C and D. For purposes of this example, office A which contains a multiplex terminal 10 is the near end office. Office D (20) is the far end office. The central offices A and D are connected together via span sections 1,2 and 3. Each span section may comprise high speed digital transmission channels employing repeaters. As indicated, the span lines employed in this system are optical fibers, but as one will ascertain, the techniques to be described for system control are applicable to high speed electrical systems as well.

The multiplex terminal 10, for present purposes, generates digital electrical signals at 44.736 Mb/s rate for transmission over optical fibers designated as 1,2,3 and N. There are four optical fibers depicted and hence, four span lines, but it is understood that more or less can be employed. Essentially, the optical fibers 1 to N operate to transmit the optical signals via the span sections through the intermediate offices B and C and hence, to the far end office D.

The span sections which will be described in detail include necessary switching and control modules to monitor the signal content and quality on each line and to switch to an alternate or protective span line in the event of a signal failure. The optical signal which is transmitted via the fibers associated with the span sections is reconverted back to an electrical signal at each intermediate office location.

As shown in FIG. 1, there is an X located in span section 1 associated with the level of cable 2. Another X exists in span section 3 at the level of cable 3. This nomenclature indicates a failure of a span line at that location, which failure, for example, could have been caused by signal degradation, repeater failure and so on. As seen in FIG. 1, cable 2 is routed via a protective span line in span section 1, while failed cable 3 is routed via a protection span line in span section 3. Accordingly, the transmission of data on cable 2 and cable 3 is not interrupted to enable the far end office D to receive all data as transmitted by the near end office A. The system to be described automatically detects a span line failure and switches the data to a protection span line by monitoring the signal transmitted.

Thus, as seen in FIG. 1, due to the failure of the second service span section between office A and the intermediate office B, the system will operate to seize the span protection line in section 1 only, leaving the remainder of the protection line to service other sections. Hence, the third service line section between intermediate office C and the far end office D will cause the protection span line to service this failure. Hence, based on system operation, the automatic protection switch of this system seizes the backup line in one section only, allowing the rest of the protection line to serve other line sections.

In order to accomplish switching and to afford the type of protection indicated in FIG. 1, one has to provide a communications channel over which control information can be sent.

Figure 2A:
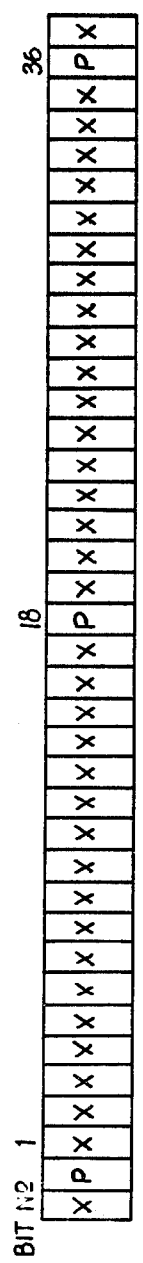
FIGS. 2A through 2C are a series of timing diagrams depicting a frame format in FIG. 2A, an even parity frame in FIG. 2B, and an odd parity frame in FIG. 2C.

Referring to FIG. 2A, there is shown two typical frames consisting of eighteen bits each. In the format depicted, the numeral P which is the eighteenth and thirty-sixth bit represents the parity bit, while numerals X represent data bits. In the system to be described, the parity bit is added every seventeen data bits and the line bit rate is increased by a factor of 18/17.

Figure 2B:
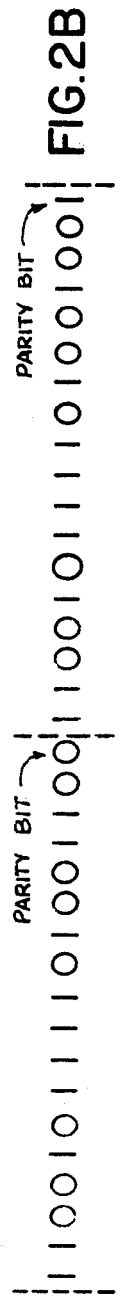

FIG. 2B depicts an even parity bit frame where the eighteenth bit or parity bit is zero and the thirty-sixth bit is a one.

Figure 2C:

FIG. 2C depicts an odd parity frame where the eighteenth bit is a one and the thirty-sixth bit is a zero.

Figure 3:
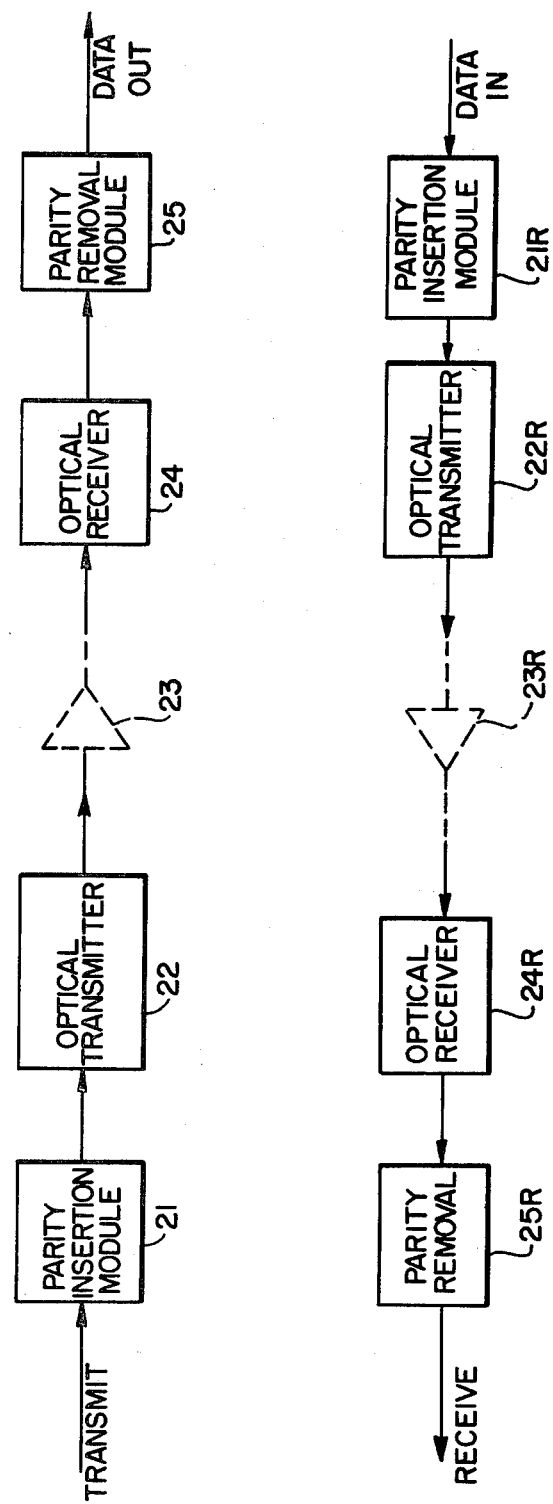
FIG. 3 is a simple block diagram depicting an optical span line.

Referring to FIG. 3, there is shown a simple block diagram of a single span line connection. The incoming electrical signal is applied to a parity insertion module 21 and then applied to an optical transmitter 22 for application to optical span line 23. At the receiving end, the optical signal is received by an optical receiver 24, converted back to an electrical signal and then transmitted to a parity removal circuit 25.

In FIG. 3, there is also shown a receiver path for an optical span line. The data is basically applied to a parity insertion module 21R and then applied to an optical transmitter 22R where it is directed over the optical span line (shown dashed), received by an optical receiver 24R and thence, to a parity removal circuit 25R.

The configurations of optical transmitters and optical receivers are well known in the art. Essentially an optical transmitter may comprise a laser diode capable of being pulsed on and off according to an electrical signal applied at its input. In this manner, the optical transmitter serves to produce a train of binary signals (light on and light off) analogous to binary ones or zeroes.

The optical receiver comprises a photo device at its input which receives the binary optical signal and converts the same to an electrical signal by the photo device responding to the intensity of light. In this manner, the parity removal circuit of both the transmit and the receive modules can operate with electrical signals as will be explained in FIG. 4 as can the parity insertion modules 21 and 21R.

It is noted that in actual practice, an optical span may constitute a single fiber, which fiber is unidirectional and hence, two fibers are needed for a transmit and a receive mode.

The dashed configurations of FIG. 3 schematically represent amplifiers as a repeater amplifier which may be employed in a coaxial transmission span line. It is understood that such amplifiers as 23 and 23R are not necessarily included in the span line configurations according to this invention.

For examples of receivers and transmitters employed with fiber optic cables and typical circuit configurations, reference is made to the Aug. 5, 1976 issue of Electronics magazine, Vol. 49, No. 16, published by McGraw Hill, pp 88–102.

In regard to FIG. 2, it is seen that the parity bit is always present in the line signal, but the parity bit does not carry any data information. Hence, this bit is to be used as a data channel to control the transfer and reset sequences in an automatic protection scheme.

Figure 4:
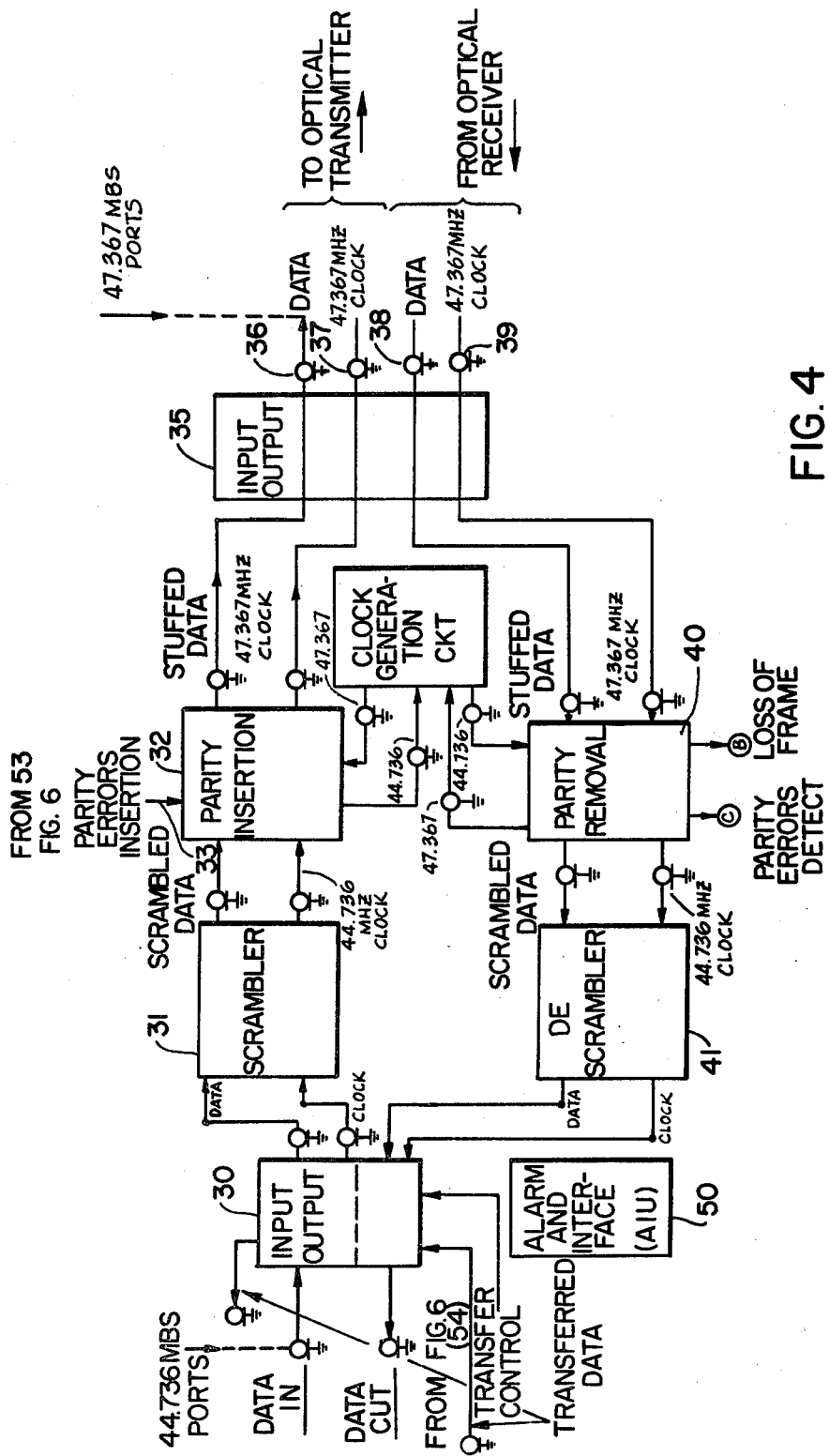
FIG. 4 is a block diagram depicting a service line terminal according to this invention.

In the configuration depicted in FIG. 4, the parity bit is inserted at a rate of 44.736 divided by 17 or at a rate of 2.63 Mb/s and therefore, the frequency at which the transfer control circuit has to operate is greatly reduced, while employing the already high speed portions of the terminal equipment.

Referring to FIG. 4, there is depicted a block diagram of terminal equipment which is employed to process the electrical signal in this system. The terminal depicted in FIG. 4 is of relatively conventional design and is the type of terminal which will work in conjunction with the fiber protection switch of this invention.

In the system, incoming data at the 44.736 Mb/s rate is applied to an input and output routing module 30 and then applied to a scrambler circuit 31. Scrambler circuits as 31 are well known in the art and essentially, operate to accept the data and the 44.736 MHz clock signal to scramble the data so that the output signal is roughly independent of the input data signal pulse density. The scrambled data enables reliable timing extraction in the optical repeaters. Examples of scrambling circuits are well known in the art and basically consist of a series of input buffer gates, a loss of signal detector and a suitable scrambling circuit which may include a flip/flop register. The main purpose of the scrambling circuit, as indicated, is to scramble data to make the output signal roughly independent of the input data signal density.

The scrambled data is directed to a parity insertion circuit 32 as the 44.376 MHz clock. In the parity insertion circuit, the parity bit is added every seventeen data bits to force even parity on a frame to frame basis. A control line 33 is used to modify the parity bit to enable one to force odd parity on command. In this manner, the system allows particular sequences of odd and even parity frames to be transmitted as part of the "handshake" between opposite ends of a span line.

The output of the parity circuit together with a 47.367 MHz clock is applied to an input/output interface circuit 35. The data on port 36 is at a 47.367 Mb/s rate due to stuffing of the parity bit and together with the 47.367 MHz clock on terminal 37 provides the input signals which are transmitted to the optical transmitter.

Incoming optical data together with incoming clock is applied to terminals 38 and 39 where it is directed to a parity removal circuit 40. In this unit, the eighteenth bit is detected and the parity bit is removed to recover the original data sequence. Framing is performed by looking for consecutive eighteen bit sequences which have even parity and once a sufficient consecutive proper count has been received, an in frame condition is assumed.

A long sequence of odd parity counts will cause the receive terminal to believe that it has lost frame. By using a framing algorithm (FIG. 5), it allows sequences of up to nine consecutive odd parity counts. Therefore, by never exceeding this number of consecutive odd parity counts, the parity bit can be employed as a data channel.

The scrambled data is then applied to a descrambler 41 which functions opposite to scrambler 31 to provide data and clock to the input/output module 30 and hence, proper data information on the output line.

It is understood that the terminal equipment depicted in FIG. 4 is relatively conventional in format with the exception of the above explanation concerning parity insertion and removal and has been included as being necessary for a complete understanding of the invention. In any event, such terminals have been employed in the prior art and for example, see a publication entitled "Fiber Transmission System", Publication No. 650058-823-001 published by ITT of Raliegh, N.C.

Figure 5:
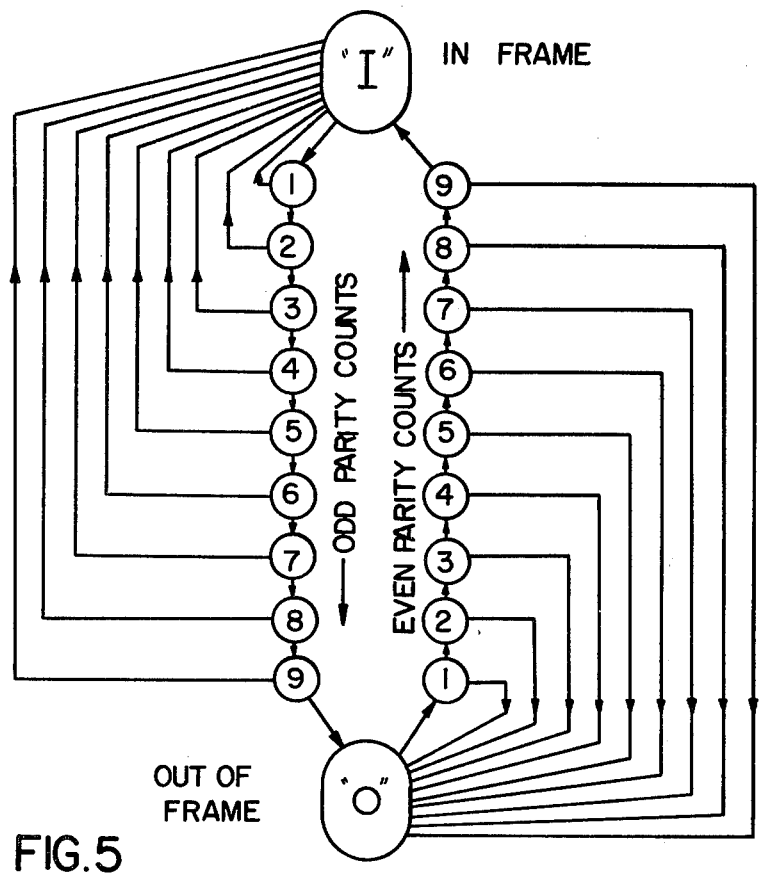
FIG. 5 is a schematic diagram depicting a framing algorithm to enable parity insertion according to this invention.

Referring to FIG. 5, there is shown a framing algorithm in schematic form to clearly indicate all possible states of the framing circuitry. In FIG. 5, I indicates the fully in frame condition, while states 1 to 9 are reached by that number of consecutive odd parity counts. An even parity count after as many as nine odd parity counts, will set the state back to the in frame condition. The zero state indicates out of frame and once this state is reached, ten additional even parity counts must be registered to return to the in frame state. It is understood that the reframe sequence is not of consequence to operation of the present invention and the framing algorithm depicted in FIG. 5 is well known, but recognizing the conditions of such an algorithm allows one to use the parity bit as a data channel.

In FIG. 4, there is an alarm and interface unit (AIU) 50. This unit is depicted in simple schematic form in FIG. 6 and the appropriate interface lines to this unit are shown. The AIU 50 will be described in greater detail subsequently, but it is necessary for an understanding of operation to indicate the nature of the interface lines to this unit in order to explain system operation.

Figure 6:
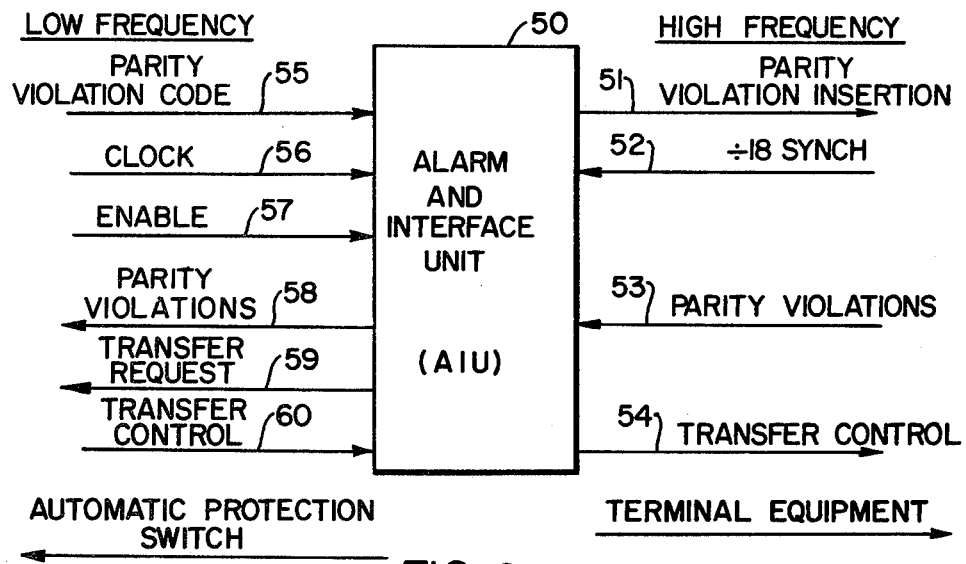
FIG. 6 is a simple diagram showing input and output signals to an alarm and interface unit (AIU) according to this invention.

Referring to FIG. 6, the AIU unit 50 is depicted with applicable interface lines. On the high frequency side of the interface, there are shown the following control lines:

Line 53 is a parity violation detection line. This is an output from the parity removal unit 40 of FIG. 4 which detects odd parity counts. The alarm unit will count these parity violations and pursuant to such violations, sets thresholds for automatic switching and alarm conditions.

Line 52 is a divide by 18 sync signal. This signal is a synchronized pulse defining the eighteenth bit frame and allows the interface unit to syncrhonize the odd parity insertions with the eighteen bit frame.

Line 51 designated as parity violations insertion is a parity violation insertion signal. Upon each positive going transistion, this line will force an odd parity count in that frame. This line is connected to terminal 33 of FIG. 4 coupled to the parity insertion module 32. Hence, this line allows control of the parity bit in each frame via the AIU 50.

Line 54 designated as transfer control is directed to the input/output module 30 of FIG. 4 and in an automatic protection switch, will control the transfer of the data signal to the spare line.

On the low frequency side of the interface, there is shown a control line 55 designated as parity violation code and a line 56 designated as clock. These two lines function to load a particular parity code violation sequence (CVS) into the interface unit. This sequence is an eight bit sequence as will be further described.

Line 57 designated as enable operates as follows: Once an eight bit word is loaded into the AIU 50, it can be outputted sequentially as a code violation sequence by impressing a high level on the enable line. As long as the enable line is high, it will be cyclically repeated. If the sequences are sent repetitively, they must be cyclically unique and therefore, one sequence is not a delayed version of another. In this manner, with an eight bit word, one can obtain thirty-two unique sequences.

As will be explained, the loading and enabling of the CVS or the parity code violation sequence is performed by the protection switch central control unit (PSC) which will be described.

Lead 58 is designated as parity violations. This lead transmits odd and even parity information to the protection switch central control unit at the frame rate of 2.63 MHz. The protection switch central control unit takes this information and decodes the eight bit word being received to implement any command signified by that word.

Lead 59 is designated as transfer request and this is activated as a result of the parity rate violation threshold being exceeded or by the loss of frame or loss of line signal and serves as a request out to the protection switch central control unit for the transfer to be enacted.

Lead 60 is designated as transfer control and it is a control line from the PSC which enables transfer to a spare span line.

Figure 7:
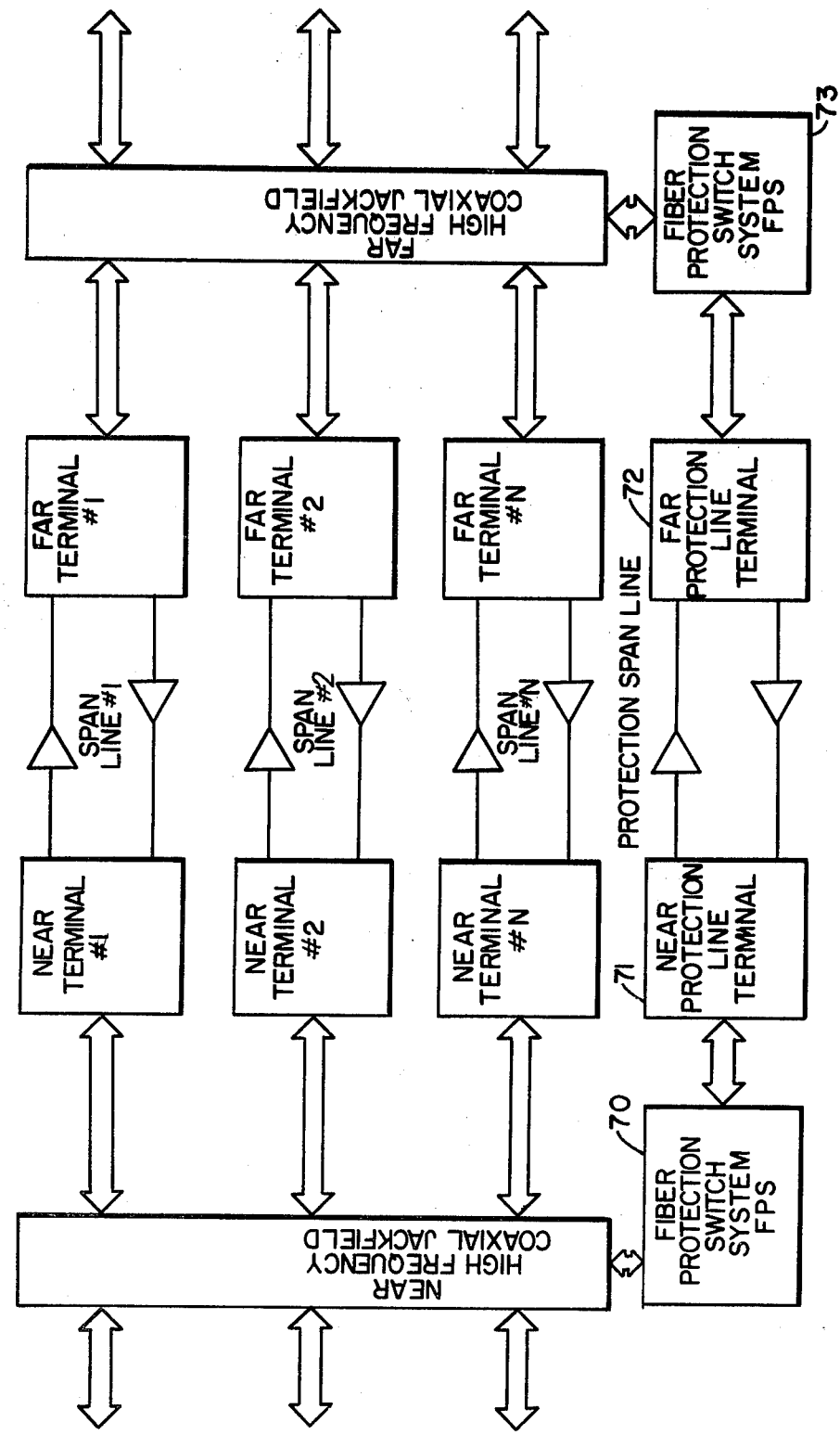
FIG. 7 is an end to end simplified system block diagram of an automatic protection system.

Referring to FIG. 7, there is shown an end to end simplified system block diagram. The terminals designated as terminals 1 through N are individual terminal units as depicted in FIG. 4. A near end terminal unit is connected to a far end terminal unit via an associated span line. As indicated, the span lines may be optical span lines. Thus, as shown in FIG. 7, near terminal 1 is connected to far terminal 1 via span line 1.

Shown in FIG. 7 are span lines 1,2 and N, each having associated near and far terminals. The terminals are coupled via appropriate buses to a near high frequency coaxial jackfield. Jackfields are well known and are used for data routing.

Shown coupled to a near high frequency coaxial jackfield is a fiber protection switch system module 70 which interfaces with a near protection line terminal 71. A far protection line terminal 72 is coupled to terminal 71 via a protection span line. The far protection line terminal 72 is coupled to the far protection switch system 73 via a suitable data bus, which system 73 is directed via a data bus to the far high frequency coaxial jackfield.

As indicated, any service effecting failure in either direction of transmission at either the near or far end will cause a transfer to occur to the protection span line. This transfer is normally effected by a set of priority rules. The priority of service span line as span lines 1 to N to transfer to the protection span line is determined by the location of the line in the terminal. In this manner, the highest priority is assigned to span line 1 and so on. If the protection span line or its associated terminals as 71 and 72 fail, all transfers are prevented. If a transfer by a service line occurs and the protection line fails, the transfer is reset. The highest priority to seize the protection line will prevent transfers by low priority lines. If a low priority line such as line 2 seizes the protection line and a higher priority line such as line 1 then fails, the higher priority line will override the lower priority line and hence, seize the protection span line. If this occurs, the low priority line will be reset.

Each fiber protection switch system (FPS) includes a protection switch control unit PSC. This unit supervises the transference reset evolutions which are brought about by the various alarms forwarded to the PSC via the alarm interface unit AIU 50 of FIG. 6. The PSC, in turn, generates control signals which cause its associated input and output units to reroute PCM data from a failed service line to an operating protection line during transfer and back to the service line at reset. Further, the FPS as 70 and 73 monitors its associated span line for evidence of failure, which in turn will cause the PSC to inhibit service line transfer to the protection line. In this manner, the transfer of a failed service line to a failed protection line is avoided as such a transfer is useless.

All PSC functions are controlled by a microprocessor such as the 8035 which has a stored program operating according to the above described sequences and sequences to be further described.

As will be shown, the PSC directly interfaces with its associated input and output units via a control bus interface (CBI) as well as with the AIU 50. When the PSC is initialized or placed in operation, it assures a unique five bit address code to each CBI unit. This address code is subsequently recognized by the CBI as a signal to accept and interprets data from the PSC and in turn, to generate DC control signals to the AIU and the input and output units. In the reverse direction, the CBI accepts alarm levels and converts them to four bit data words for transmission to the PSC.

The input unit will be referred to as a DTI and receives an electrical signal through a suitable hybrid to provide at an output a two rail NRZ data and clock signal. The output unit, designated as DTO, provides a compatible signal which is derived from the two rail NRZ data and clock signals forwarded by the DTI. The input signals from the PSC control operation of the DTO.

In order to best understand system operation, reference will be made to FIGS. 8 through 19 which will describe a sequence of events that occur at the near and far end of the system during the transfer and reset operations necessary to access the protection or spare span line. The sequence of events to be described relate to the automatic mode of operation. The basic objects of the system operation have been discussed in conjunction with FIG. 1 and FIG. 7.

In FIGS. 8-19, in order to understand signal flow, various line configurations have been used as shown in the legend. For example, a broken line which is a series of successive dashes and dots represents the transmission of a "keep alive" signal. A heavy line represents the transmission of active control and data signals. A dashed line represents the transmission of a code 1 signal, while a dotted line represents a data inhibit mode.

In the FIGS. 8-19 and in the system to be described, the data signal is a 44.736Mb/s electrical waveform known in the art as a DS-3 signal. This signal is converted to an optical signal and transmitted via an optical fiber, which fibers constitute both the service and protection lines which are shown in FIGS. 8-19.

NEAR END NORMAL OPERATION

Figure 8:
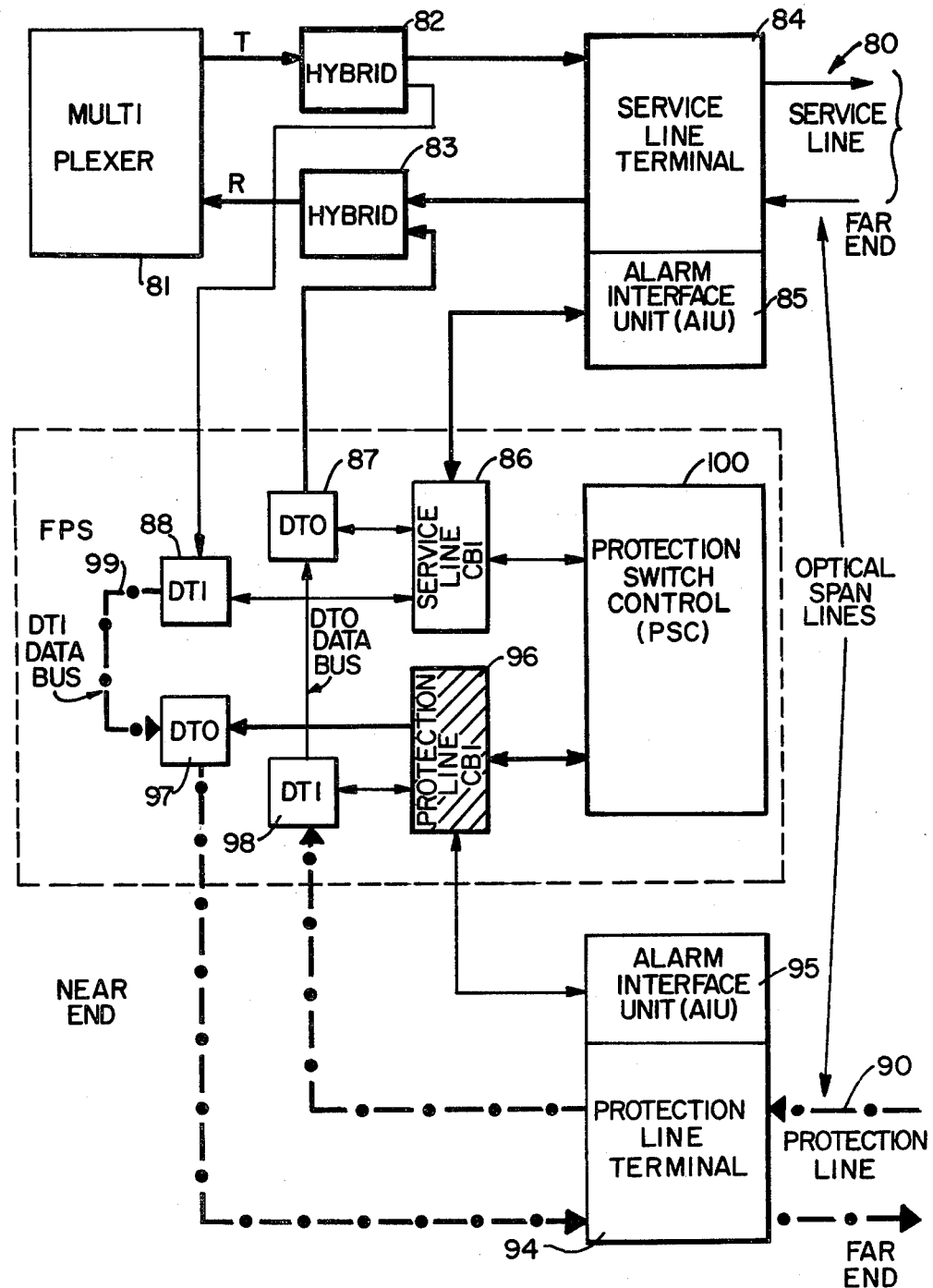
FIGS. 8 through 19 are a set of simplified block diagrams that are useful in depicting the timed sequence of events to show the transfer of a faulty service line to a protection line and in particular.

Referring to FIG. 8, there is shown a near end terminal 84 which is designated as a service line terminal and has the configuration depicted in FIG. 4. The protection line terminal 94 is also shown and is associated with a protection span line 90. The service line terminal is associated with the service line 80. Each terminal as 84 and 94 has a separate AIU unit as 85 and 95 which is the alarm interface unit briefly described in FIGS. 4 and 5.

The service line terminal is associated with a transmit hybrid 82 which receives transmitted data from the multiplexer 81 (as 10 of FIG. 1). The service line terminal transmits received data to the receive hybrid 83 for transmission to the received port of multiplexer 81.

Shown enclosed in the dashed lines is a service line CBI 86 which is associated with terminal 84 and a protection line CBI 96 which is associated with protection line terminal 94. Each CBI as 86 and 96 communicates with the respective AIU 85 and 95. The service line CBI interfaces with its data transfer output module 87, while protection line CBI 96 communicates with its DTO 97. The output of DTO 87 is further directed to an input of received hybrid 83. The service line CBI 86 also communicates with the line DTI 88, while the protection line CBI communicates with DTI 98. Located between the service line DTI 88 and the protection line DTO 97 is a DTI data bus 99.

The protection switch control unit (PSC) 100 communicates with the service line CBI 86 and the protection line CBI 96. The protection line terminal has a first data path coupled to its DTI 98 and a second data path which emanates from its DTO 97.

In FIG. 8, the service line terminal 84 and its associated service line 80 are operating normally as are terminal 94 and protection line 90. The protection switch control unit or PSC 100 is providing a control signal test pattern insert to the protection line DTO 97 via the protection line CBI 96, which test signal is the binary signal 101010. This signal is a "keep alive" signal. The DTO 97 verifies reception of this signal by sending a test pattern detect signal through DTI 88 to the PSC 100.

Hence, as one can ascertain, during the generation of the keep alive signal, which as will be explained further is 101010, the PSC executes a diagnostic routine which operates to monitor the operational status of the system as will be further described. Hence, in FIG. 8, during a normal traffic condition on the service span line 80, the protection line DTO 97 gates a 101010 pattern onto the transmit direction at the respective system ends.

SERVICE LINE AIU DETECTS AN ALARM CONDITION

Figure 9:
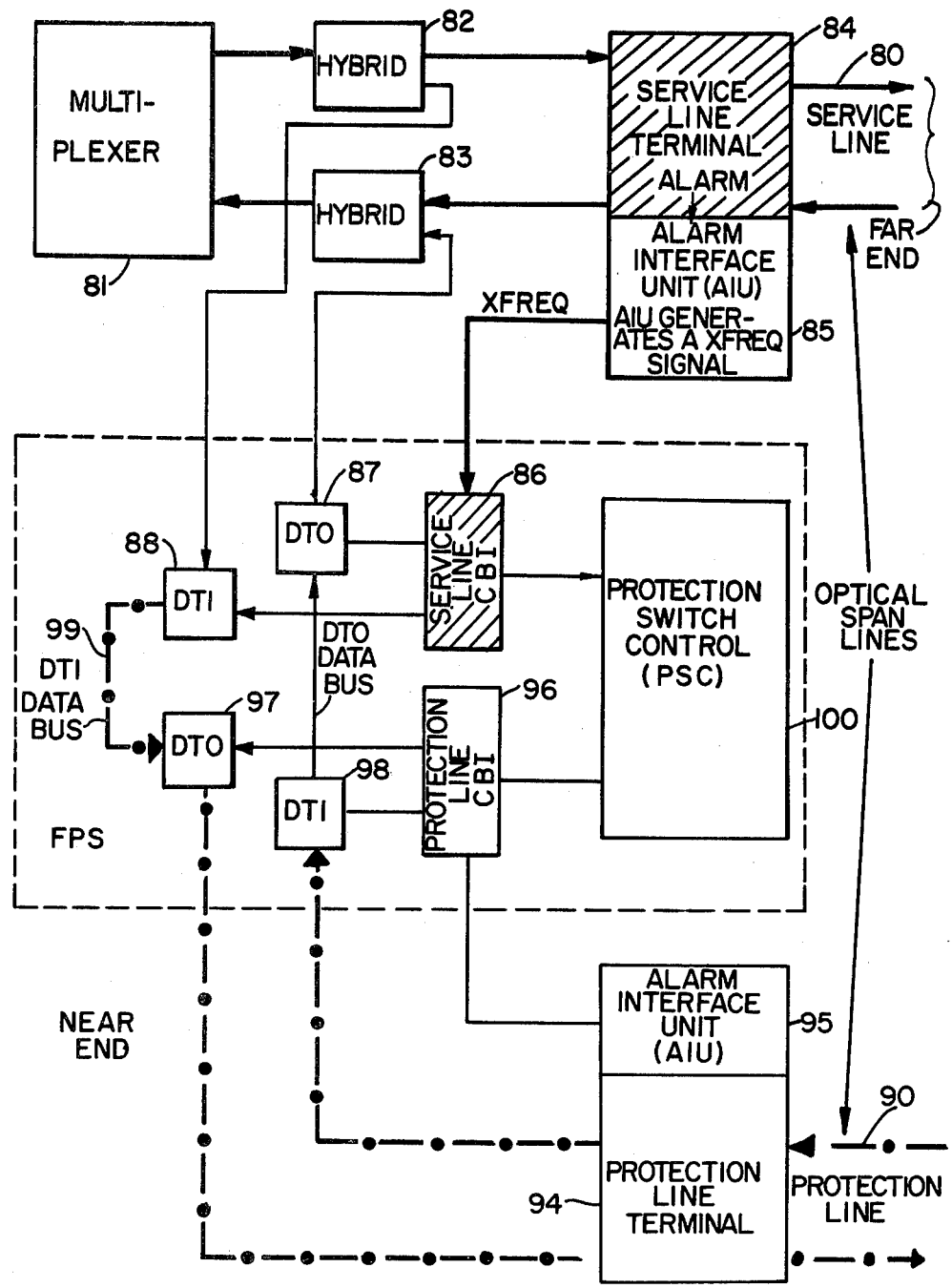

Referring to FIG. 9, the AIU 85 of the service line has detected a major alarm condition in the local service line terminal 84. Under these conditions, the AIU generates a transfer request (59 of FIG. 6). The transfer request (XFREQ) is directed to the PSC via the CBI 86. In addition, the AIU 85 pauses for one second before enabling a major alarm, which will be further explained. The major alarm (MAJ AL) is not implemented until after a one second pause, as will be explained.

THE PSC DETECTS THE TRANSFER REQUEST

Figure 10:
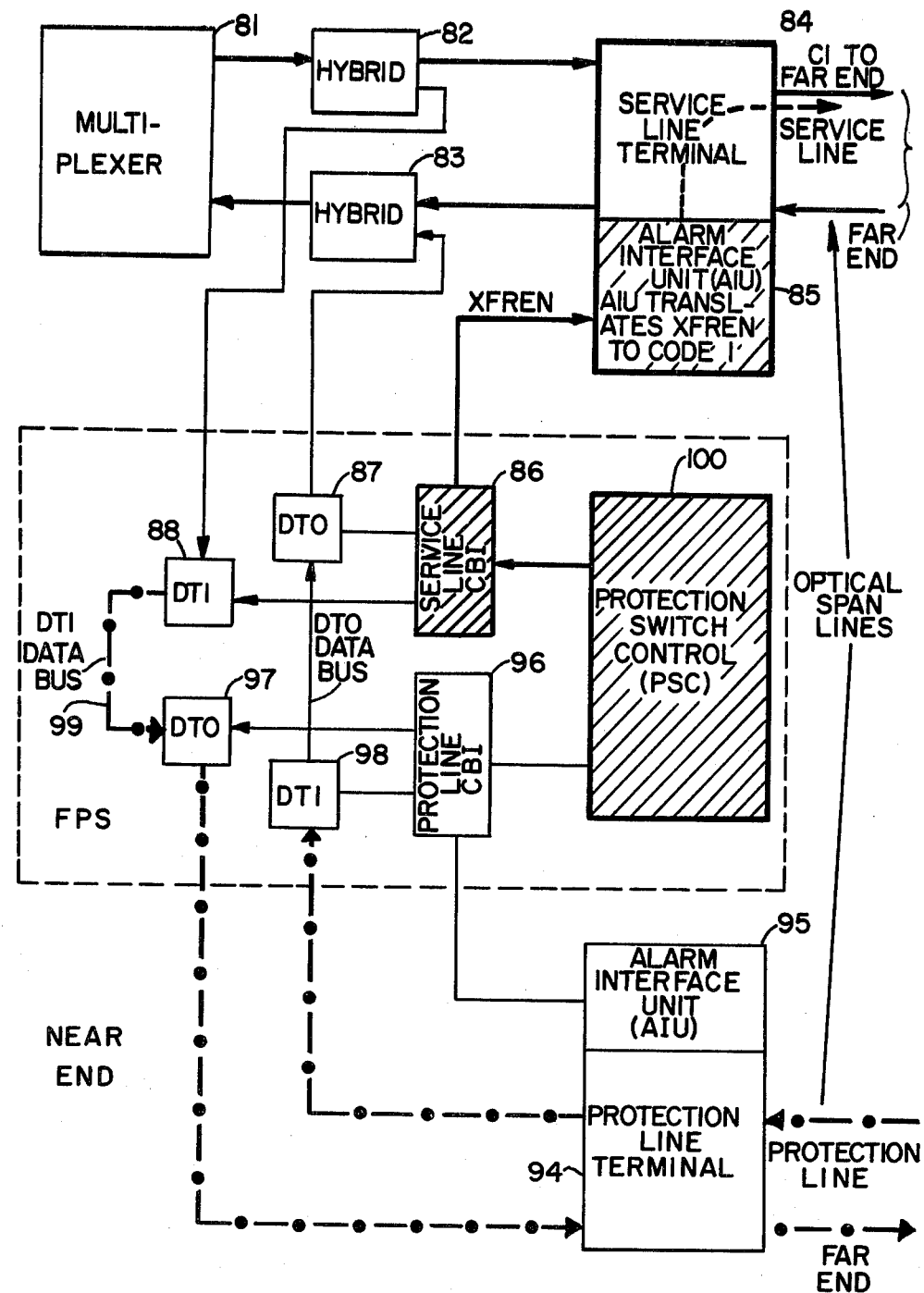

Referring to FIG. 10, there is shown the sequence of events next occurring. The PSC has sensed the transfer request as shown in FIG. 9. The AIU receives the acknowledged signal from the PSC (XFREN) and translates this acknowledged signal to a code 1 parity violation sequence which is transmitted to the remote end. In essence, the AIU acknowledges the fact that the PSC has detected the transfer request by generating the code 1 transmission. The presence of the transfer request causes the protection switch control 100 to initiate an interrupt via a stored program routine. When the interrupt occurs, the PSC immediately switches to a transfer subroutine. In sequence, the PSC obtains the address of the failed service terminal from the CBI unit 86 associated with the terminal. As indicated, the CBI is assigned a unique five bit address code by the PSC, which code enables the PSC to access the CBI and hence, to accept and interpret data and to therefore in turn generate DC control signals to the AIU, DTI and DTO.

In the reverse direction, the CBI accepts alarm levels and converts them to four bit data words for transmission to the PSC. The PSC, as monitoring the protection line terminal, also determines that the protection line can accept transfer data and therefore transmits the transfer enabled (XFREN) to the AIU 54 of FIG. 6. The AIU initiates this DC level into a hexidecimal code word known as code 1 (01010101 or 55H). The AIU 85 forwards code 1 to the transmit (FIG. 10) direction of the service line terminal as shown by the dashed lines to notify the remote terminal that a transfer is to take place, as will be explained.

The PSC 100 continues to step through the transfer subroutine generating control enables to operate to latch both the service and protection CBIs 86 and 96, which in turn enable circuits at the near end.

PSC TURNS ON SERVICE LINE DTI

Figure 11:
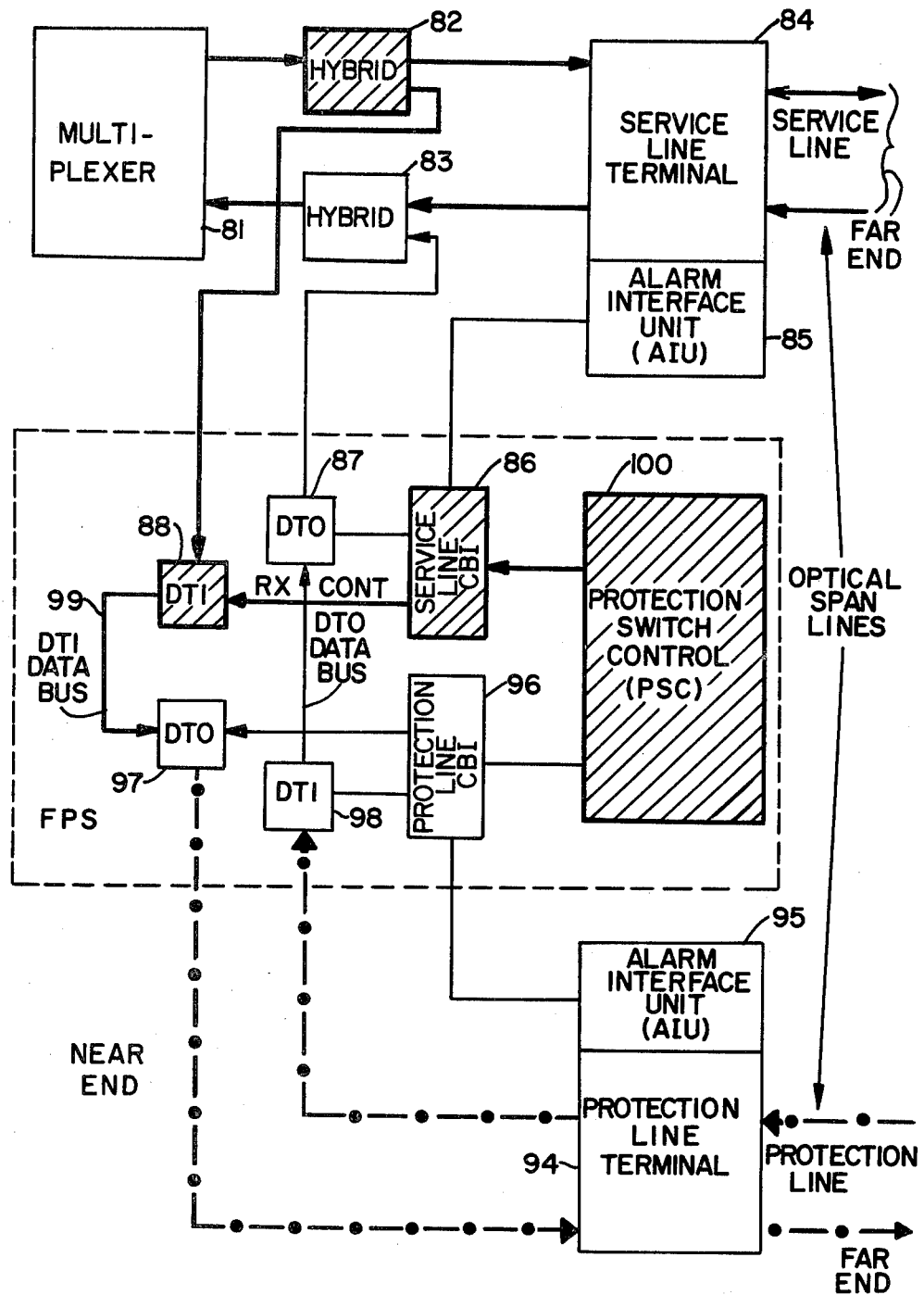

Referring to FIG. 11, the PSC 100 supplies the service line CBI 86 with a receive control signal (RX CONT), which in turn latches the service line DTI 88 gating the data signal from hybrid 82 onto the DTI data bus 99.

PSC ACTIVATES THE PROTECTION LINE CBI

Figure 12:
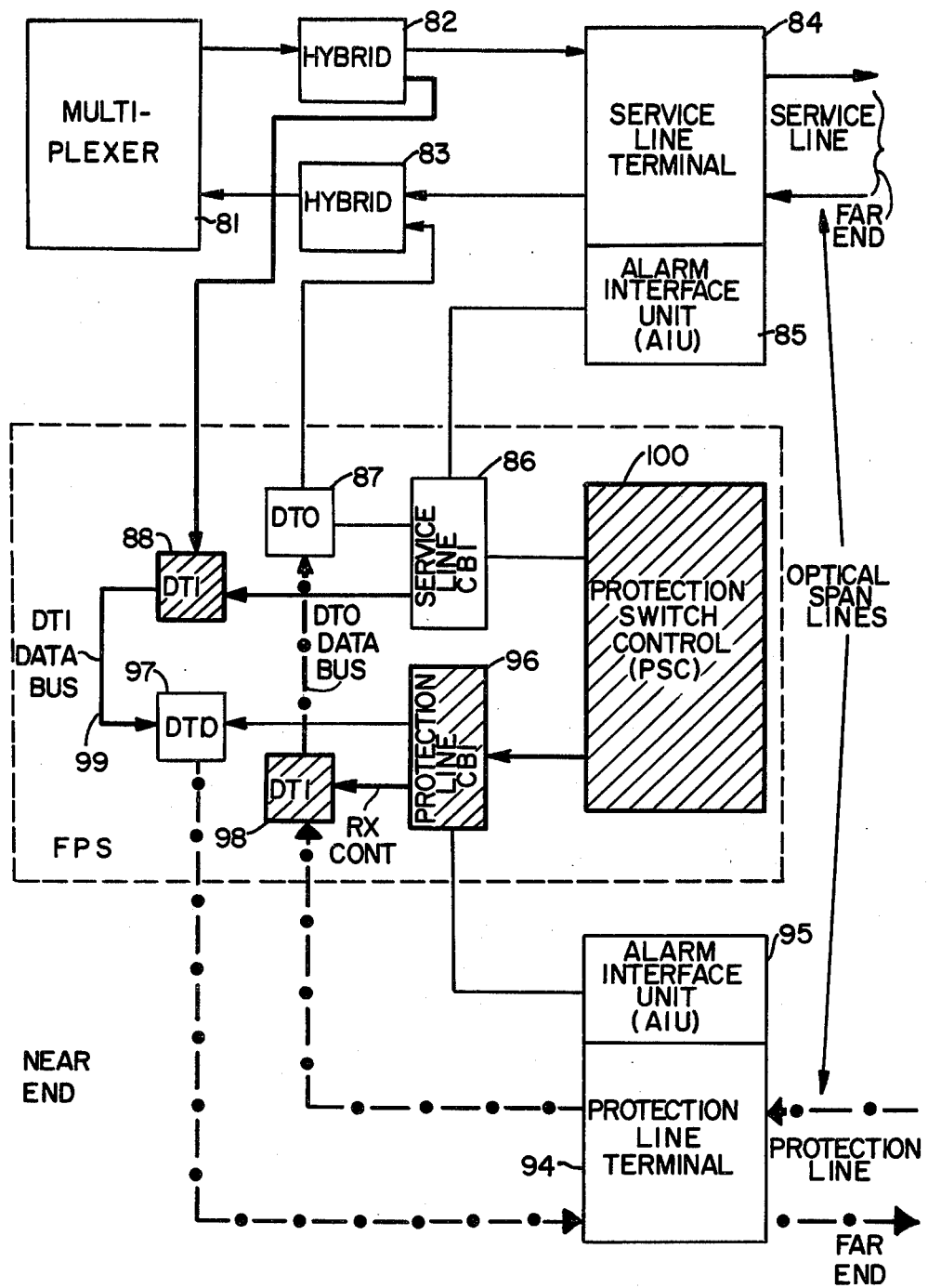

Referring to FIG. 12, the PSC now supplies the protection line CBI 96 with a receive control signal, which in turn latches the protection line DTI 98 gating the protection line receive signal which is the keep alive signal onto the DTO data bus. The DTO 87 is coupled to the receive hybrid 83 and hence, a receive path is afforded through protection line DTI 98, the service line DTO 87 to the hybrid 83.

THE PSC SUPPLIES THE PROTECTION LINE WITH A TRANSMIT CONTROL SIGNAL

Figure 13:
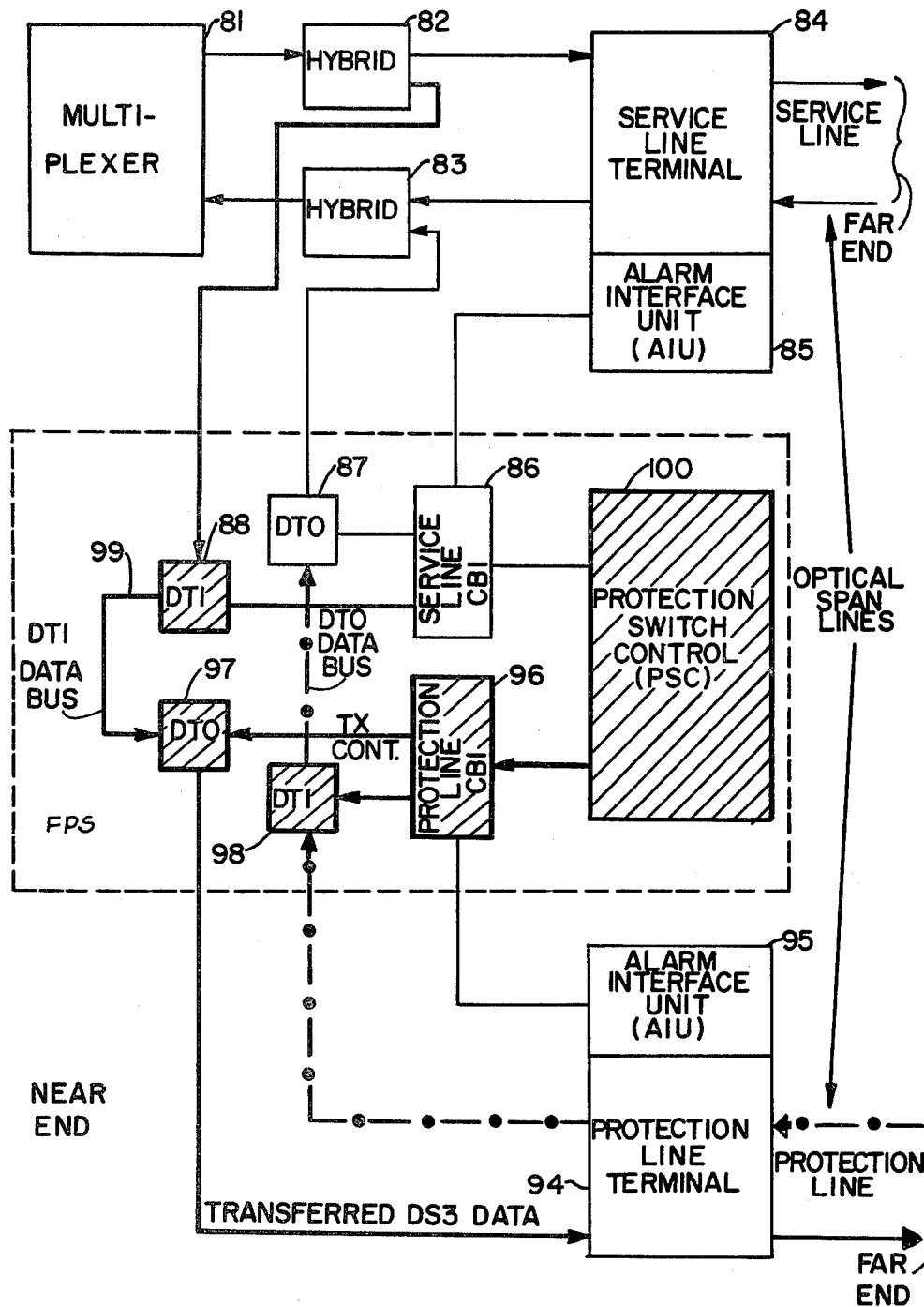

Referring to FIG. 13 and simultaneously with the actions occurring in FIG. 12, the PSC supplies the protection line CBI 96 with a transmit control signal (TX CONT), which in turn latches the protection line DTO 97. This inhibits the keep alive signal and serves to therefore gate the near end transmit signal from hybrid 82 onto the protection line transmit direction. This occurs via DTI 88, the DTI data bus 99, DTO 97 and thence, to the protection line terminal 94. In this event, the keep alive is still being received from the far end which is untransferred.

THE PSC INHIBITS SERVICE LINE TRANSMIT DIRECTION AND COMPLETES TRANSFER AT NEAR END

Figure 14:
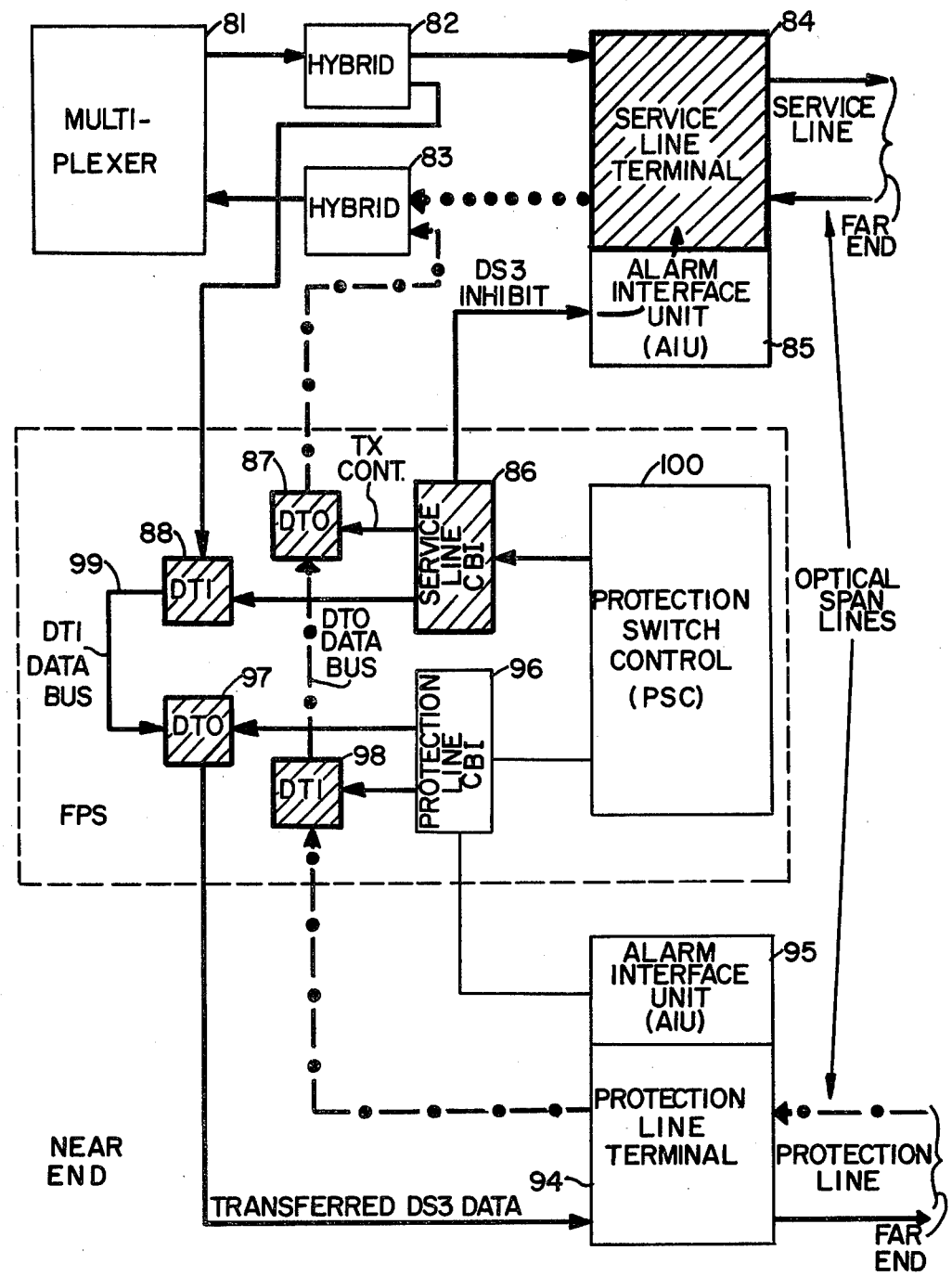

Referring to FIG. 14, the PSC turns off the service line terminal with a DS 3 inhibit signal coupled to the service line terminal via the AIU 85. This in turn removes the data input to the receive hybrid 83 as shown in FIG. 14. Simultaneously, the PSC 100 supplies the service line CBI 86 with a TX CONT signal, which in turn latches the service line DTO 87, which thereby gates the receive direction from the protection line into the hybrid 83. This path is afforded through the protection line terminal 94 via its DTI 98 and DTO 87 of the service line. This completes the transfer at the near end.

At this point in time, it is now noted that the far end terminal still has the data signal impressed upon its transmit line. The receive path at the near end is completed, but the far end is still transmitting a keep alive signal towards the near end. The transfer at one end, as above described, requires approximately 250 microseconds.

TRANSFER SEQUENCE IS REPEATED AT THE FAR END

Figure 15:
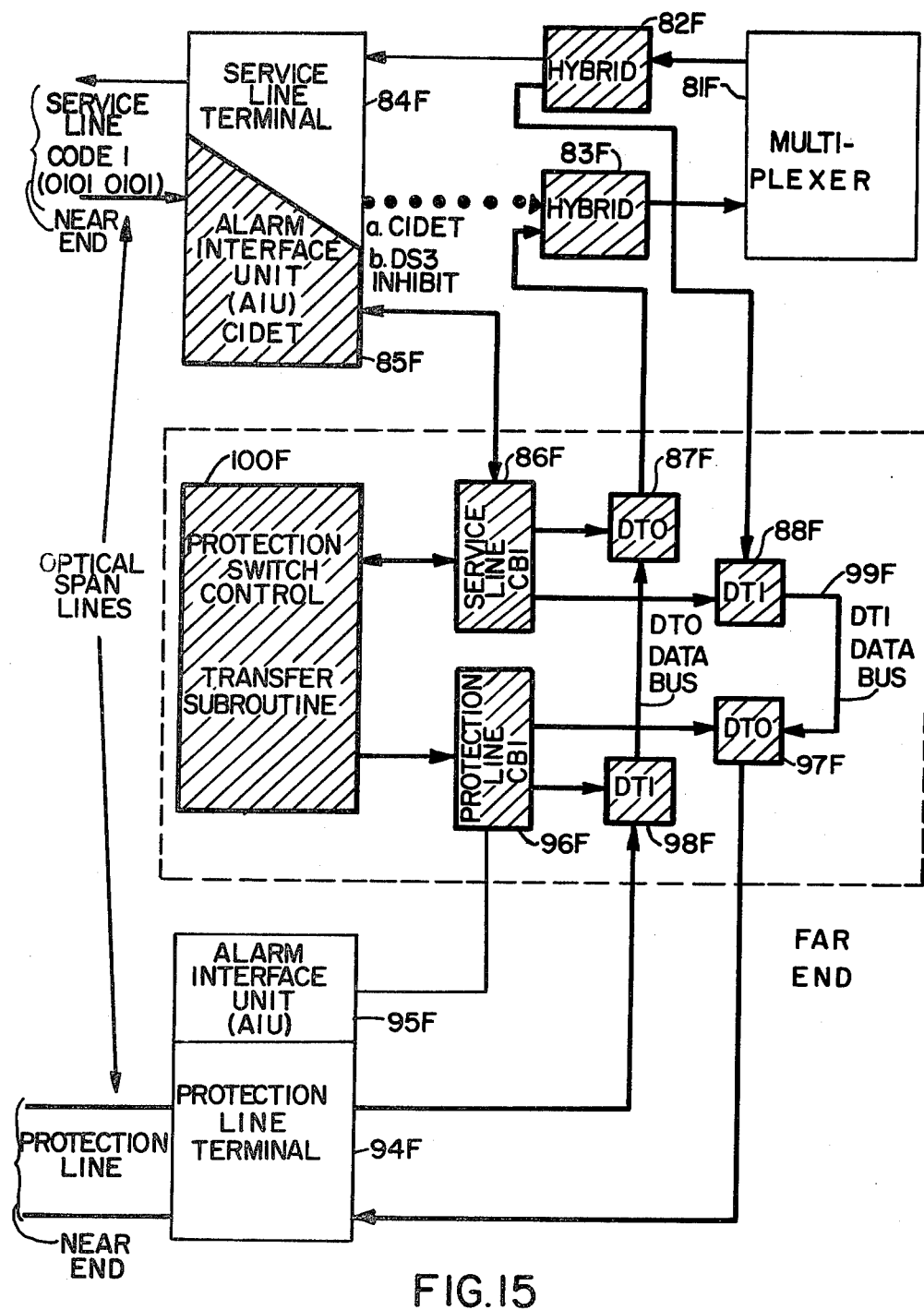

Referring to FIG. 15, the far end terminal is shown. As indicated, the individual components at the far end are identical with those at the near end and hence, similar numerals have been retained with the far end terminal and reference numerals followed by the letter F denote the far end.

At the far end, the service line AIU 85F has detected a code 1 which is being transmitted from the near end. This code 1 informs the AIU 85F that a failure has occurred at the near end. The AIU 85F translates the code 1 into a code 1 detect signal (CIDET) which it forwards to the PSC 100F. This signal produces the same exact effect on the PSC 100F as the XFREQ signal had on PSC 100 at the near end.

Thus, the PSC 100F switches to the transfer subroutine which causes an identical transfer sequence to occur at the far end whereby all transmit and receive data at the far end are now applied to the far end protection line terminal 94F. Thus, both ends have now transferred to the protection line. Accordingly, it is understood that at this time, the keep alive was removed from both directions of transmission just prior to transfer. The normal data outputs from the service line terminals as directed to the hybrids are inhibited for the duration of the transfer. The transfer sequence, as described, is completely symmetrical and may be inhibited at either end of the system with the same results.

As indicated above, it was explained that the near end AIU 85 paused for one second before initiating a major alarm closure (MAJ AL). The AIU 85 waits or watches for the XFREN signal from the near end PSC 100 and if it does not receive this signal, it times out. The time out activates the major alarm lamp or other visual indicator. This also occurs at the far end. If a major alarm occurs, it indicates that there is a failed service line which has not transferred and this is a permanent indication to the system user. If the XFREN signal is received, the AIU converts the major alarm to a minor alarm, thus indicating a line failure and implementing the transfer to the protection span line.

With the above description in mind, after the PSCs 100 and 100F complete the transfer routine just described, they switch back to the last instruction executed in the main program and continue in the main program cycle. The main program contains a subset of instructions to generate a status word. This word contains the address of the transferred service line system, which address is the same at both ends of the system and further contains a reset okay bit. The address part of the word determines that a proper transfer occurred to provide fail safe operation to insure that a split transfer has not occurred. The status word is periodically transmitted from both ends of the system.

Figure 16:
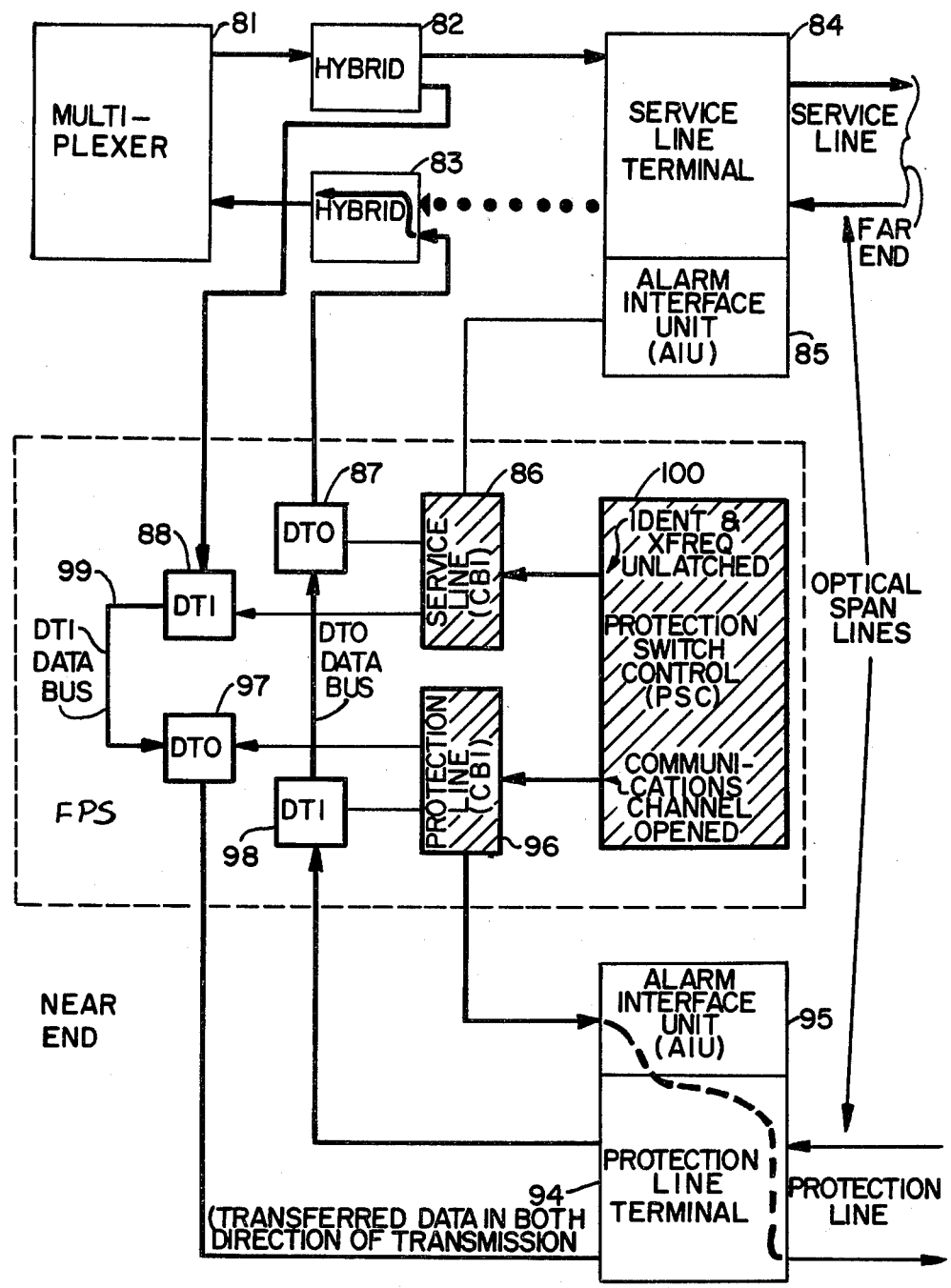

In the sequence depicted, to implement a transfer subroutine, a counter is loaded. The counter is held in a set position as long as the XFREQ signal line at the near end is active. When this line goes passive, the timer is set to zero, setting a reset okay flag at the near end. This flag is transmitted to the far end in the status word. In such circumstances where a transfer occurs at the near end, the XFREQ signal is never active at the far end. Hence, the timer commences its countdown as soon as transfer is completed at the far end. When the timer goes to zero, the far end transmits a reset okay flag to the near end. When the reset okay is received and transmitted at the rear end, it provides the enable signal for a branch routine which corresponds to the reset subroutine in the main program of the PSC. It is understood that this branch routine does not preempt the main program as was done in the case of a transfer request, but is initiated by a request sequential program instruction that has been written in such a way as to take into account the reset okay flag status. The sequential steps in the reset routine cause the following near end control signals to occur:

Referring to FIG. 16, the near end PSC 100 will open a communications channel to the far end via the parity bit which occurs during every eighteen time slots. In FIG. 16, it will be described how a reset commences at the near end and the communication channel to the far end is established.

The PSC 100 clears the XFREQ and IDENT latches on the service line CBI 86. The IDENT is a line which is directed to each CBI that senses the unit's location in the assembly which allows it to be assured a unique address by the PSC 100 during the initialization process. The PSC 100 sets priority interrupt threshold such that a new failure in the service line system undergoing reset will effectuate a proper transfer. This is necessary to prevent the reset routine from masking or hiding a new failure.

Figure 17:
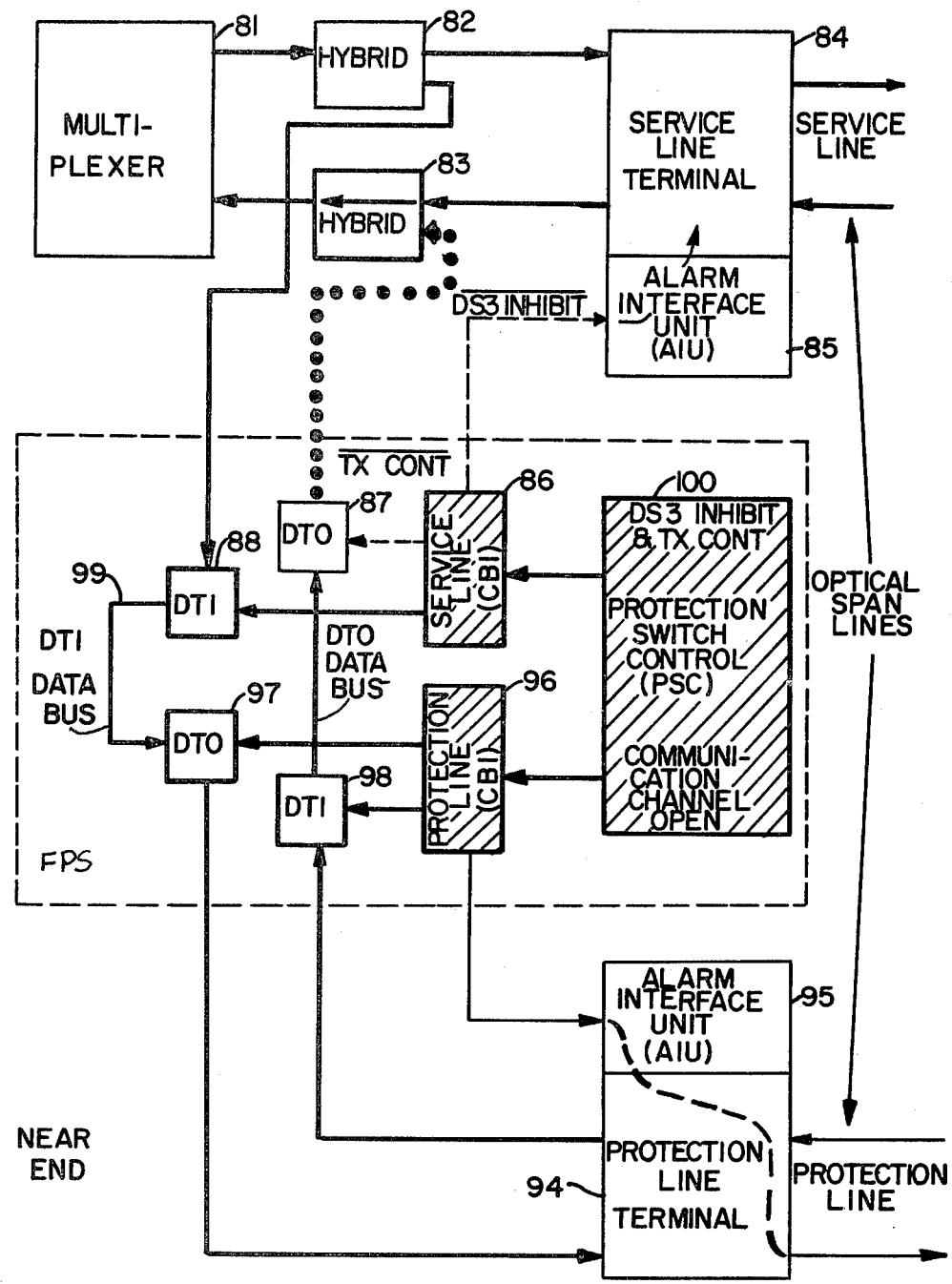

Referring to FIG. 17, there is shown near end operation where the PSC 100 clears the DS3 inhibit to reset the receive direction at the near end. The PSC 100 clears the DS3 inhibit and the TX control latch on the service line terminal and turns off the service line DTO 87. Received data is now obtained via the service line and the receive output of the protection line has been blocked at the DTO. The transmit direction is unaffected in this sequence.

Figure 18:
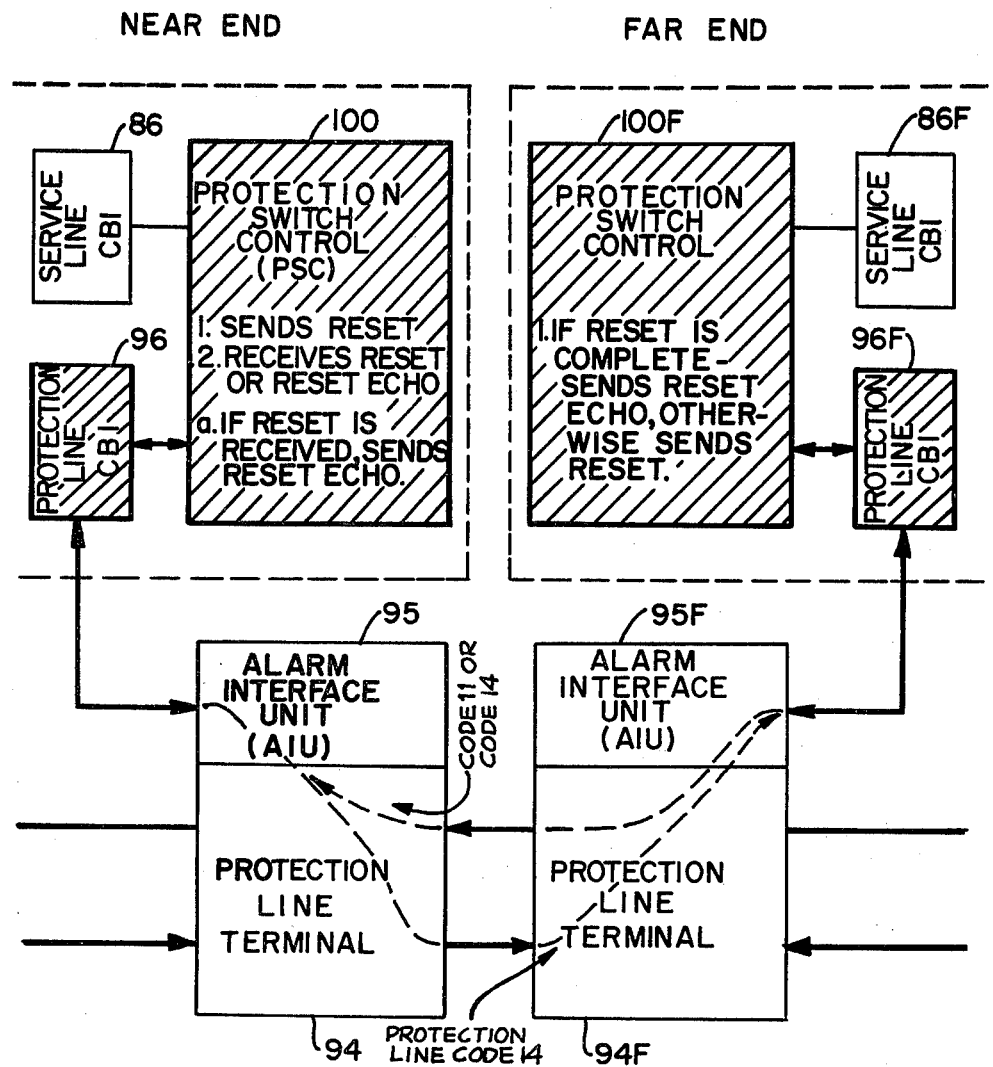
Figure 19:
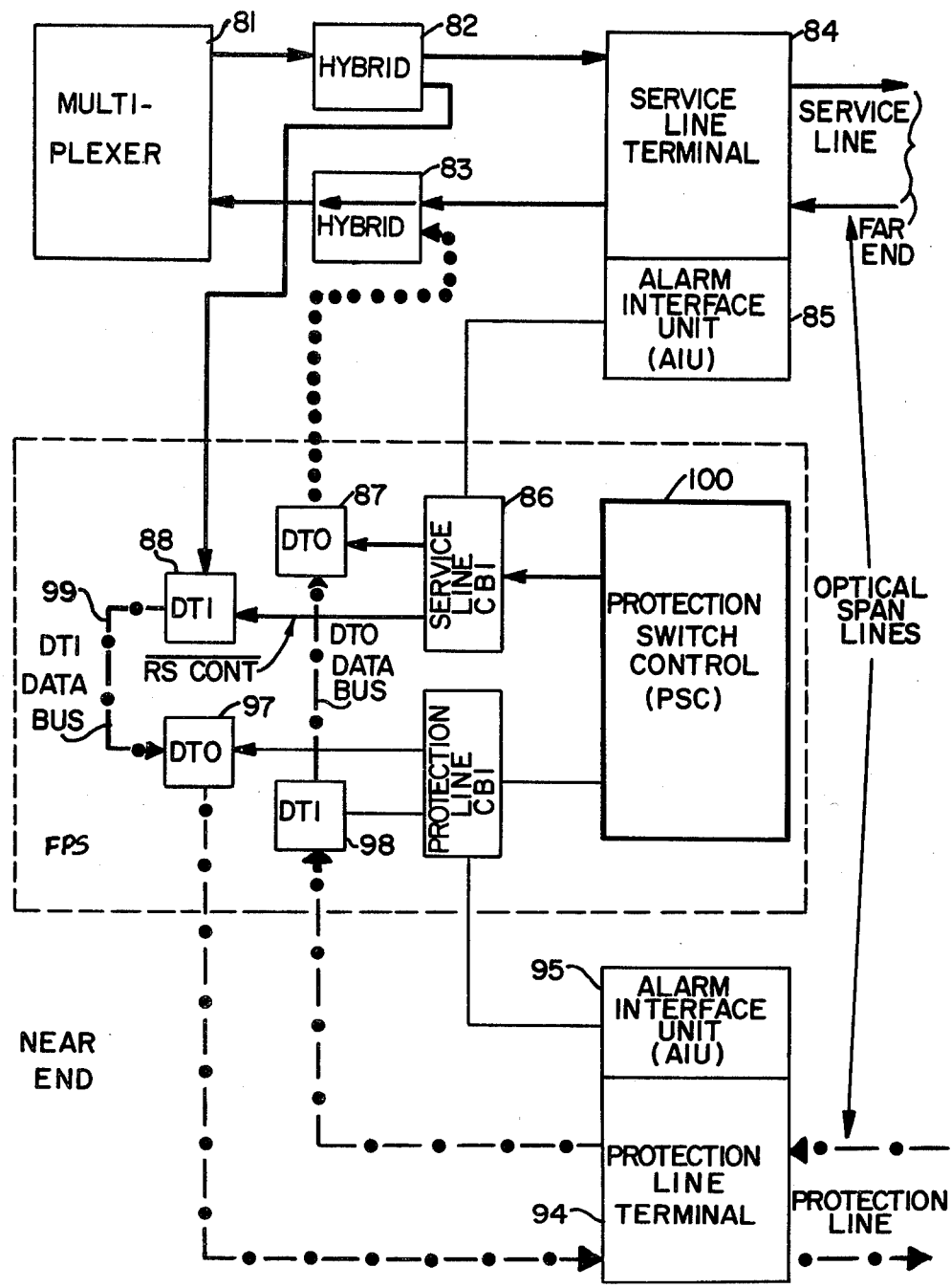

Referring to FIG. 18, there is shown a near and a far end system. The PSC 100 at the near end transmits a reset code (Code 14 OB hexidecimal or 00001011 binary) to the far end and waits for the far end PSC to send either reset or a reset echo (code 11-05 hexidecimal or 00000101 binary). The far end returns reset echo if the reset sequence is completed at the far end. Otherwise, it transmits reset. This establishes a route for both ends. Thus, if reset is received, the PSC 100 or 100F responds with a reset echo. If the reset echo is received, the PSC ceases transmission of reset/reset echo. As a result, of the reset/reset echo, both ends commence a series of steps to completely reset as follows:

Referring to FIG. 19, the PSC 100 activates the test pattern selected in the protection line DTI 98. This removes data in the transmit direction via the service line DTO 87. This action restores the 101010 keep alive pattern to the protection line. As a result, transfer data has been removed from the protection line in both directions of transmission. The PSCs at both ends clear the RX CONT from the service line DTIs to therefore remove the input data from the DTI bus 99. The PSCs at both ends clear the transfer request (XFREN) from the service line AIUs 85 and 85F removing the major alarm inhibit. The PSCs at both ends reset the priority threshold to the lowest level to thereby enable the low priority service line to transfer in the absence of any transfer request from a high priority line.

It is, of course, understood that the above described automatic transfer can be manually implemented.

Essentially, the above described description indicates how a transfer is accommodated to a span line for a service line failure. It is, of course, noted that operation occurs independent of the type of span lines employed and hence, the above described system will operate with fiber optic span lines or coaxial lines.

As indicated above, the transmission system employs parity bit addition to the data bit stream for error detection purposes. In this case, there is no redundancy in the original binary sequence and hence, it cannot be altered except by increasing the frequency to insert extra parity bits. Thus, as indicated, upon detection of an alarm condition, the near end PSC operates to open a communications channel to the far end or vice versa via the parity bit employed as a control signal. In this manner, a unique sequence of codes can be provided, as will be explained, which employ parity bits both for bit error rate purposes as is done in the prior art, but also for a control information channel, which channel operates to switch in a protection span line in the event of a service line failure.

In implementing system operation, an eight bit code word is employed, which code word defines up to thirty-two codes or commands and which words are contained in a cyclical code. These codes are extremely important to system operation as will now be explained.

THE AIU OPERATING CHARACTERISTICS

Basically, the AIU 85 operates to respond to system alarms and sends the proper loop signals to the PSC and the service line terminal. The AIU thus, as shown in FIG. 4, is an inherent and important part of the line terminal. Essentially, there are seven alarms which are monitored by the AIU. It is noted at the onset that these alarms are conventional alarms found in telecommunications systems and techniques for detecting these conditions are well known.

A first alarm is designated as the E.Q.L.O.S.. This alarm indicates an equipment loss of signal alarm and specifies a loss of signal to the input/output module 30 of FIG. 3. This alarm can be classified as a major or minor alarm depending upon the operation of a particular switch.

REMOTE L.O.S.

The remote loss of signal alarm is a loss of signal to the input/output unit 35 and is also classified by the user.

TX LOL

This alarm indicates that there is a loss of lock on the clock signal and is a major alarm.

RCCPR

This alarm indicates one of two alarms and specifies that either a clock converter has lost lock or the parity removal unit 40 has lost frame on the data.

SPAN L.O.S.

Span loss of signal means that there is a loss of signal to an optical receiver unit as unit 24 of FIG. 3. This is a major alarm.

EXCESSIVE ERRORS

This alarm indicates that the error rate on an optical span line has exceeded the error rate threshold which is selected by a user.

LVFA

This low voltage and fuse alarm emanates from the system power supply and occurs when the power is interrupted.

In the event of a major alarm, the AIU alerts the PSC and waits for a response. Many of the alarm functions of the AIU are well known in the art and have been implemented in prior systems. In any event, in this particular system, there are three high priority lines that the AIU must handle extremely rapidly. These lines are the XFREQ, the CID and the XFREN. In the event of one of these lines becoming active, the AIU sends a transfer request signal, as indicated, to the PSC. If the code word 1 is detected by the AIU, it sends a code 1 detect signal CID to the PSC. If the local AIU receives a transfer enable signal XFREN from the PSC, it then sends the code word 1 CI to the remote AIU.

The AIU communicates with the PSC via serial input data lines. The received parity code is the data line going to the PSC. Depending on the particular code word in the parity code, the AIU can communicate between itself and the PSC and can convey messages from the local PSC to the remote PSC via the parity code. Accordingly, the AIU communicates directly with the PSC by means of conventional handshake lines which mark the beginning and end of communications between the AIU and PSC. If the PSC initiates a communications sequence, its interrupt line goes to a low condition. The AUI responds by sending a low. If the AIU initiates a sequence, the handshake routing is reversed. If either the PSC or AIU breaks the link between the units, the corresponding interrupt line will go high.

The above sequence is extremely simple to implement and is a typical operating procedure between two electronic systems. Hence, such handshake lines are well known and conventional in the art and have been described in order to enable a clearer understanding of communications between the AIU and the PSC. Therefore, the communications between the AIU and PSC must consist of unique codes which are manifested by forcing the parity bit to be modified to thus provide sufficient codes indicative of parity bit variation to enable proper communictions between the AIU and the PSC.

As indicated in conjunction with FIG. 6, the low frequency and high frequency lines to the AIU are derived from the parity information. The local AIU communicates with a remote AIU via the parity bit in the data stream and the AIU will insert an eight bit code word ten times for a total of eighty bits of code. The other AIU will detect and process the code and initiate the proper response. Thus, the AIU can communicate with its counterpart at the remote end of the switch.

In the above manner and in regard to data code depicted in FIG. 2, the AIU and the PSC can communicate with each other and have remote counterparts using eight bit cyclical code words. There are thirty-two code words available as shown in FIG. 20. When a code word is transmitted over a span line, the $B_0$ bit is sent first and the $B_7$ bit is sent last. Hence, the code words depicted above can be employed to denote various operations. For example, code 1 is employed by the local AIU 85 to alert a remote AIU 85F that a transfer has started at a local or near end. Code 2 is sent by the PSC to alert the AIU that the local PSC will communicate with the remote PSC. Code 3 is employed as a reset command in order to eliminate a code 2,4,5 or 6 condition. Code 4 indicates that an AIU and associated circuitry wants to transmit errors down the span line.

Various other codes in cyclical order can be employed to implement all remote and local communications. These codes are implemented by the parity insertion circuit 32 of FIG. 4. The parity insertion unit basically operates to insert a parity bit into the pulse stream at every seventeen data bits and retransmits the pulse stream at 18/17 times the incoming frequency.

As indicated in FIG. 2, a zero parity bit is transmitted for an even number of marks and a 1 parity bit is transmitted for an odd number of marks. The parity insertion circuit 32 controls insertion of the parity bit into the 44.736 MHz bit stream from the scrambler 31. This occurs under control of the clock from the clock generation circuit of FIG. 3. Circuits for performing bit stuffing employing a fixed frequency stuffing process for parity insertion are well known.

Figure 21:
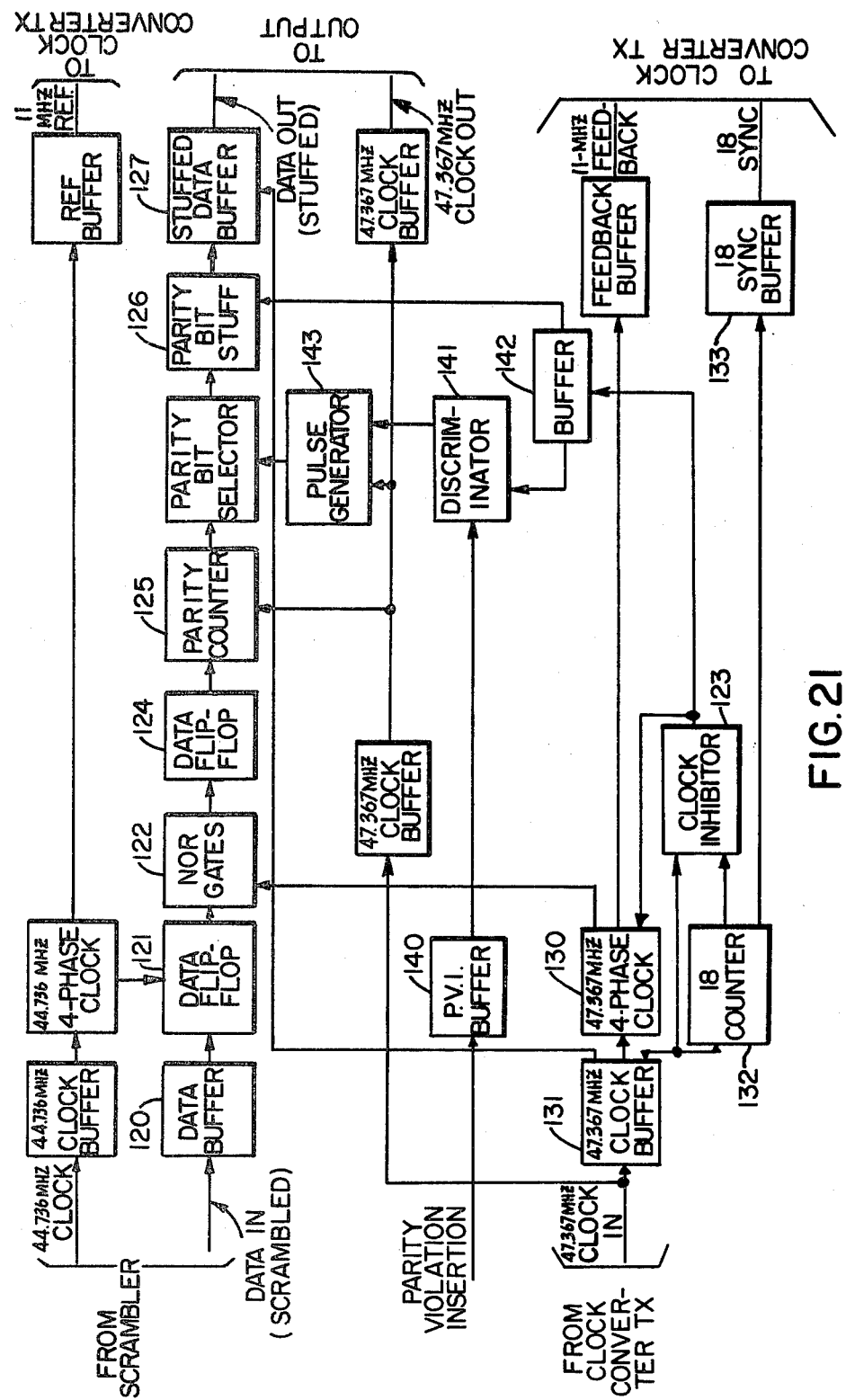
FIG. 21 is a detailed block diagram of a parity insertion circuit according to this invention.

Referring to FIG. 21, there is shown a block diagram of a parity insertion unit which can be employed for the parity insertion module 32 of FIG. 4. A brief description of operation will be given as many of the circuit components in FIG. 21 are well known.

The incoming scrambled data is applied via a data buffer 120 into data flip/flops 121 at the rate of 44.736 MHz. The data is gated out of NOR gate 122 at a 47.367 MHz. After gating seventeen data bits, the gating action is inhibited for one bit by the clock inhibit circuit 123 to allow time for a parity bit to be inserted. The gated data is clocked into a data flip/flop 124 which feeds the parity counter 125 and the parity bit stuffing circuit 126 including the stuffed data buffer 127. The resulting stuffed data is clocked out of buffer 127 at the 47.367 MHz rate.

Figure 22:
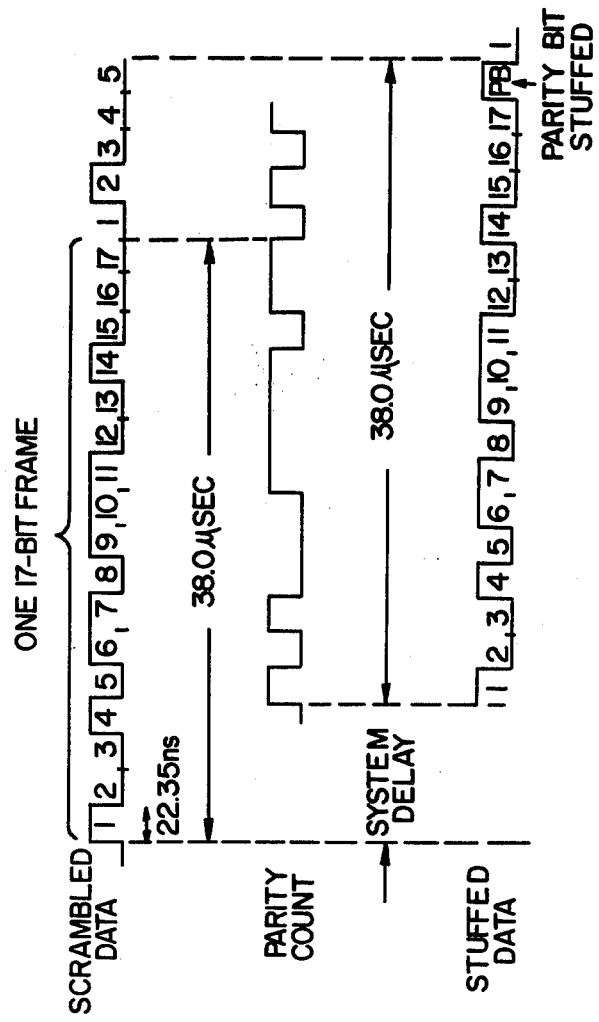
FIG. 22 is a simplified timing diagram of parity insertion as implemented by the circuit of FIG. 21.

Referring to FIG. 22, there is shown a simplified timing diagram of parity insertion. The incoming scrambled data as buffered by data buffer 120 and fed into the data flip/flops 121 is clocked into the flip/flops by a 44.736 MHz four-phase clock derived from module 130. The data from the flip/flops is gated out via the NOR gates 122 under control of this clock to the data flip/flop 124.

Figure 23:
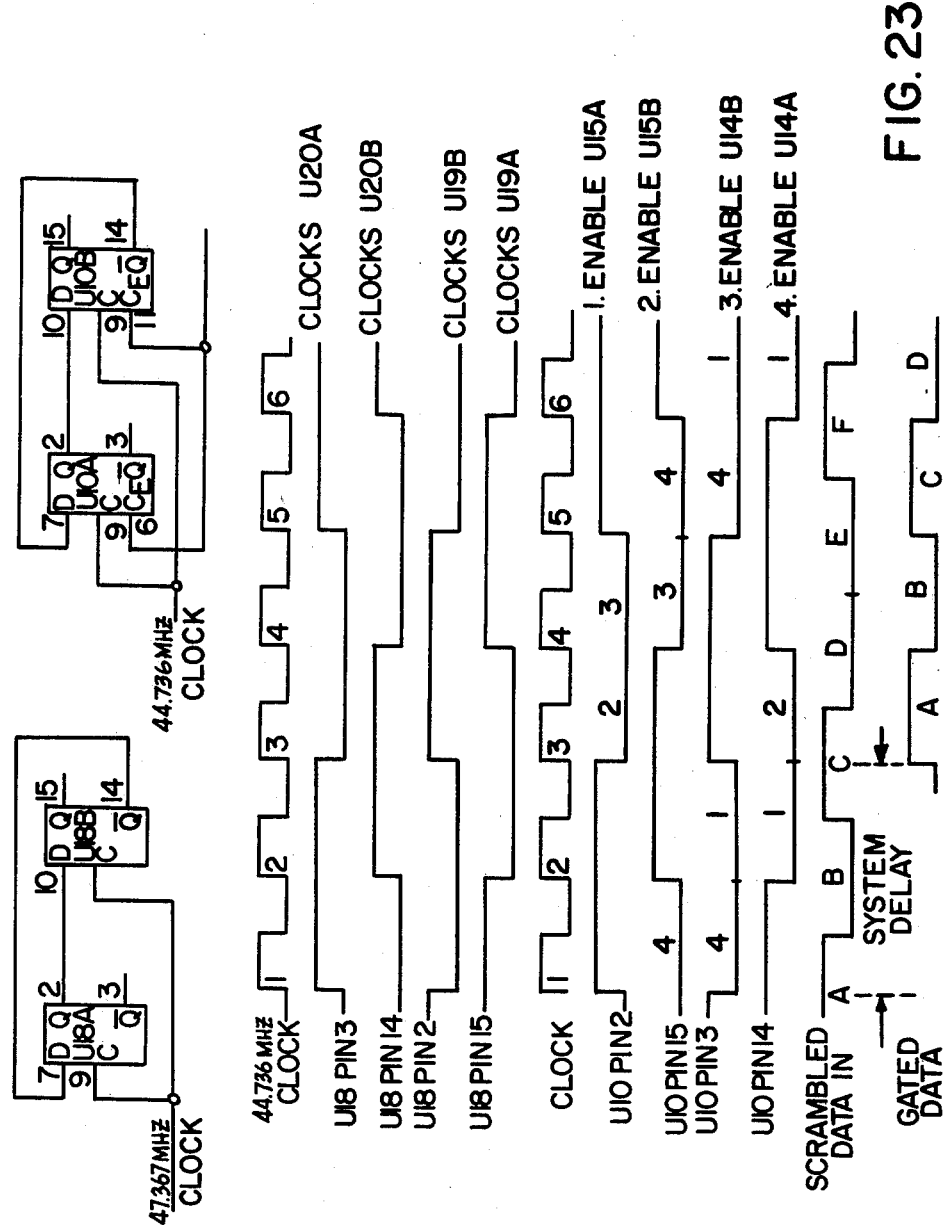
FIG. 23 is a store and gating timing diagram and component structure useful in explaining operation of the parity circuit.

FIG. 23 is a timing diagram which depicts the store and gate process. As shown in FIG. 23, the incoming 44.736 MHz clock is clocked into the data flip/flop 121 on the rising edge of the first clock period. The same data bit is gated out of the NOR gate 122 when terminals 3 and 10 shown in FIG. 23 which are employed for the four-phase clock, are low. The data bit is then clocked into the data flip/flop 124 on the rising edge of the third clock period. The incoming 47.367 MHz clock is fed via clock buffer 131 and a divided by eighteen counter 132 to the clock inhibitor circuit 123 which produces a clock inhibit pulse at its output. This pulse is used to initiate the stuffing process since a parity bit is stuffed after every seventeenth data bit. The output of counter 132 is also fed to a sync buffer 133. A divided sync pulse appears at the output of buffer 133 at the same time the parity bit appears at the output of the data buffer 127. This divided sync pulse can be used to mask the parity bit. A parity counter circuit consists of the parity counter 125.

Figure 24:
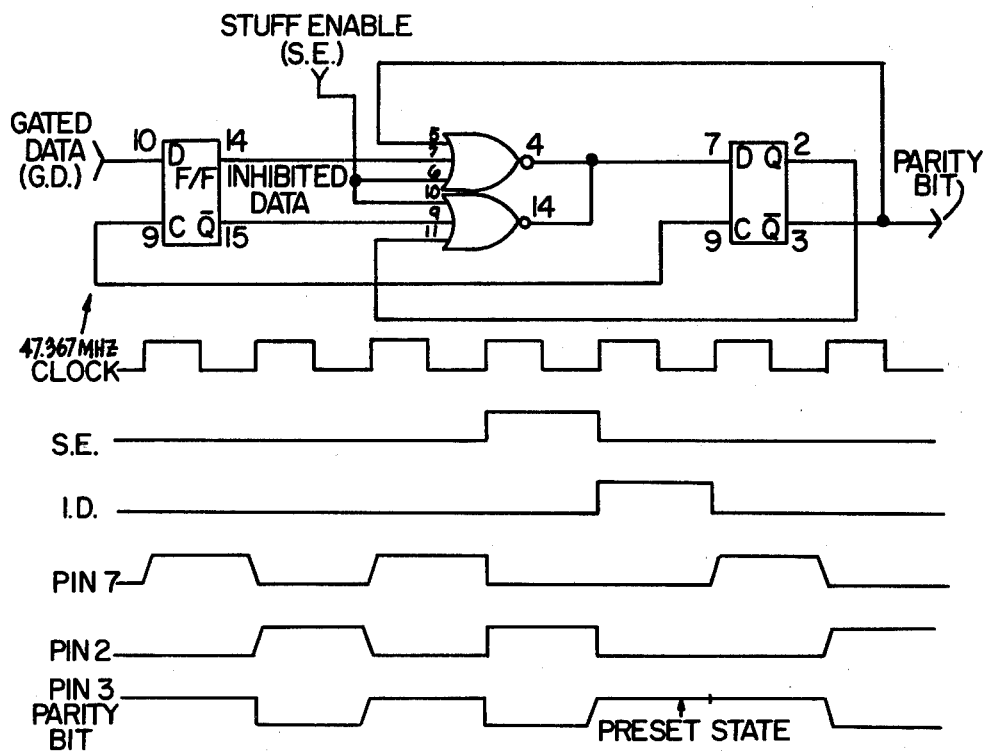
FIG. 24 is a simplified block diagram and timing diagram of a parity counter according to this invention.

Referring to FIG. 24, there is shown a timing diagram denoting the operation of the parity counter circuit. The parity counter as shown in FIG. 24 is basically a toggle flip/flop. When the output 15 of the flip/flop is at logic one, the parity bit at the flip/flop output 3 stays the same. Once the output 14 of the flip/flop goes to zero, the parity bit starts to toggle. At the end of seventeen parity bits, the parity counter is preset by the stuff enable pulse to a logic one state. Then, the process continues the clock period after the stuff enable pulse goes low. The parity bit stuffing process is a synchronous procedure which takes a total time of three clock periods to perform.

Figure 25:
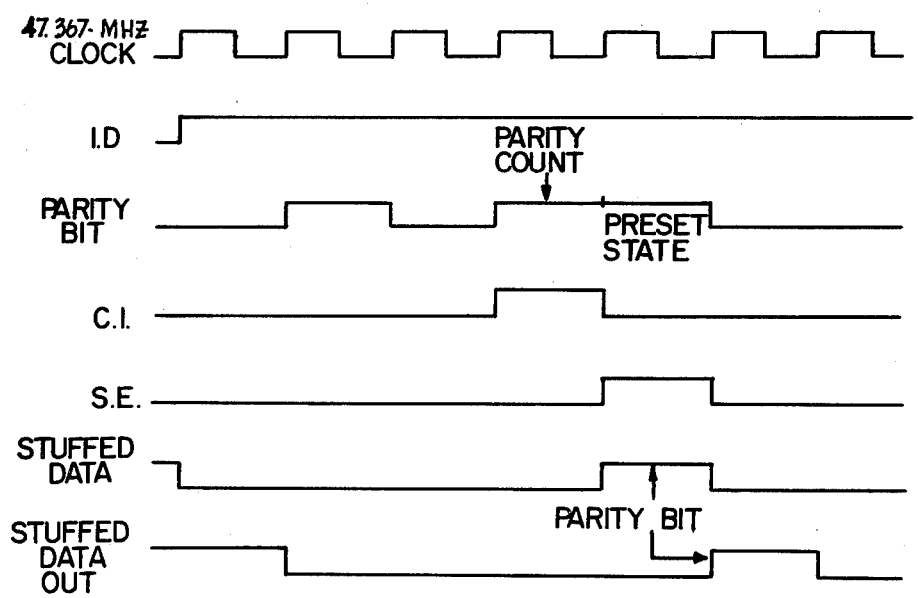
FIG. 25 is a timing diagram depicting parity bit stuffing according to this invention.

FIG. 25 is a timing diagram of the stuffing process. When the clock inhibit pulse goes high, it stops the four-phase clock circuit 130 for the necessary clock period. The clock inhibit pulse applies a logic one to the input of the parity bit stuff circuit 126. This allows one to stuff the parity bit on the input of the stuffed data buffer 127. On the next rising edge, the parity bit will be clocked out of buffer 127 as stuffed data out to the optical transmitter. The parity bit can be inverted to cause a parity bit violation and hence, to control the information conveyed by the parity stream as above described.

A falling edge of the signal on the parity violation insertion (PVI) input to buffer 140 is fed to a discriminator 141 where it is digitally differentiated. On the falling edge of the PVI input signal, a logic one is clocked into the discriminator by means of buffer 142 and appears at the input of the pulse generator 143 for one clock period. When the clock inhibit goes low, the discriminator is reset. The logic one signal at the input of the pulse generator 143 appears at the output when the stuff enable pulse goes high. Thus, the pulse generator will enable inverted parity bit to be inserted into the stuffed data output. In this manner, the unit allows for deliberate violation of parity to be transmitted required for proper operation of the automatic detection switch as above described.

Figure 26:
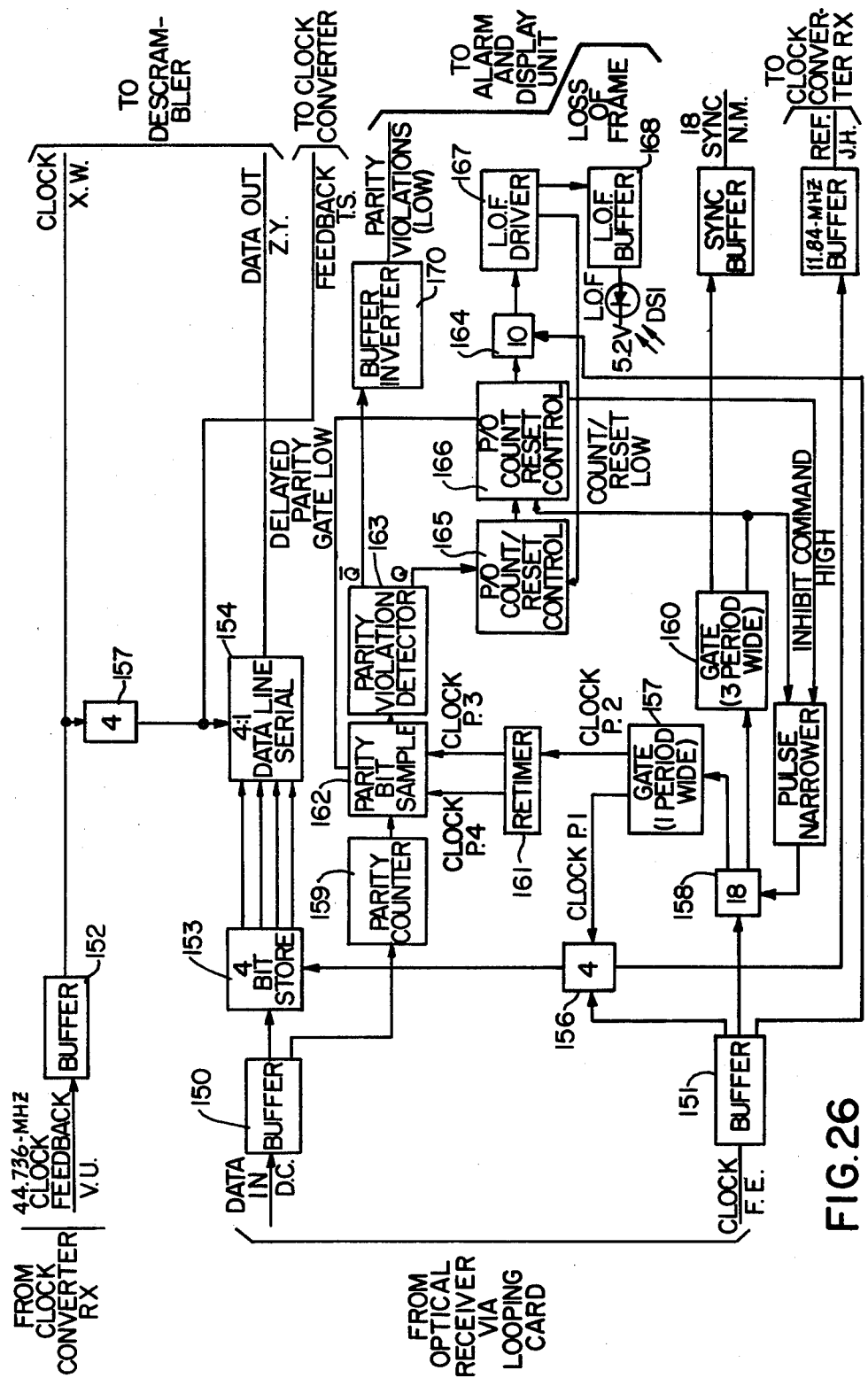
FIG. 26 is a detailed block diagram depicting parity bit removal circuitry according to this invention.

Essentially, the parity removal circuit 40 is shown in block diagram in FIG. 26. The parity removal circuit removes the parity check bit from the pulse stream and provides an output pulse stream at 17/18 times the incoming frequency. The parity removal accepts incoming data applied to buffer 150 and an incoming clock applied to buffer 151 at 47.36 MHz. These are obtained from the optical receiver. The unit reframes the incoming sequence and performs a parity check during each frame. Under control of a 44.736 MHz signal applied to buffer 152 and obtained from the clock generation circuit of FIG. 4, the unit also removes the previous inserted parity bit and brings the bit rate of the data back to 44.736 MHz.

A four bit store circuit 153 is used to accommodate digit jitter due to frequency translation and any accumulated line jitter. The input data as buffered by buffer 150 is clocked into the four bit store 153 bit by bit. The output of the four bit store are sequentially gated in the four to one data line serial converter 154. Divide by four counter 156 and 157 control the buffering operation. Counter 157 gates the serializer 154, while counter 156 clocks the four bit store. Counter 156 as driven by the incoming clock is inhibited for one pulse in eighteen which is the parity time slot by the gating circuit 157 which provides a gate one period wide by means of the divide by eighteen counter 158.

Thus, the parity bit is not clocked into the four bit store and is eliminated from the output data stream. The incoming data via buffer 150 is also fed to a parity counter 159 which retimes the data stream and acts as a toggle. The toggle output will always be in the same state as the data time slot immediately following the parity bit time slot, unless there are parity violations.

Figure 27:
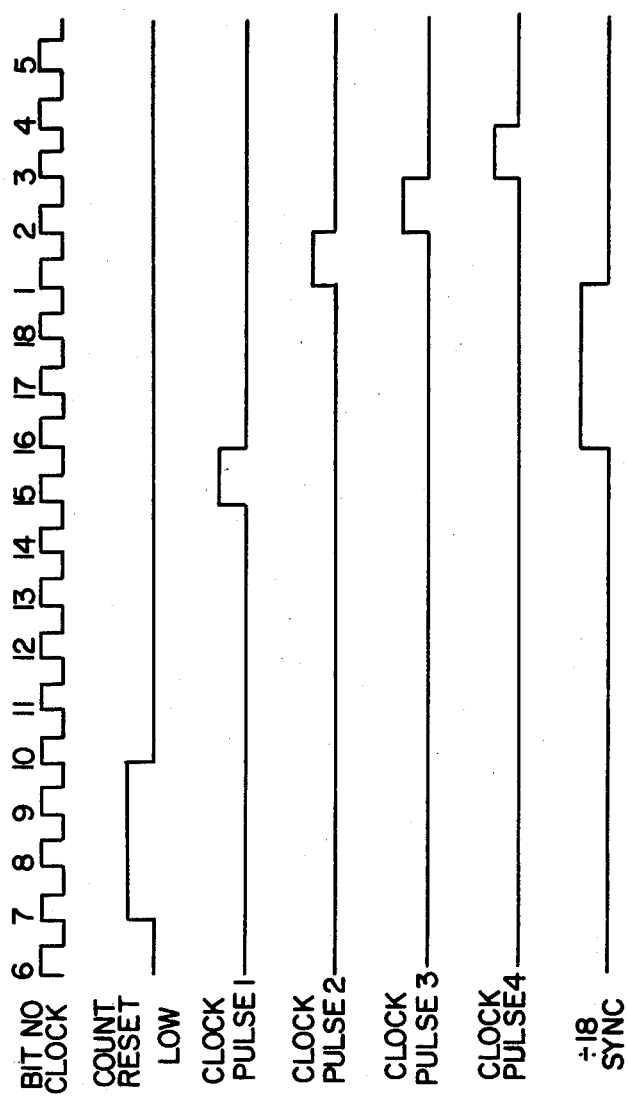
FIG. 27 is a timing diagram depicting a gating sequence used in parity removal.

The output of counter 158 is also applied to gate 160 which together with gate 151 provides four phases of the divide by eighteen clock sequence. This gating sequence is shown in FIG. 27. One of the four phases of the counter 158 is retimed in retimer 161 to provide a one period wide pulse, clock pulse 3 and delayed by one clock period to produce clock pulse 4.

When the unit is in frame, clock pulse controls the sampling of the parity bit and stores it in the parity bit sample 162. Therefore, 162 contains the present and previous parity samples which are exclusively ORed by the parity violation detector 163. If the two samples are the same indicative of no parity violations, then clock pulse 4 gates a low onto the Q output of the parity violation detector 163. If the two samples are not the same, a parity violation has occurred and the Q output of detector 163 goes high.

The Q output of detector 163 is fed to a divide by ten counter 164 via a count reset control arrangement consisting of modules 165 and 166. As long as no violations are being received, the divide by ten counter 164 will continuously reset. Each time a violation occurs, counter 164 will count up by one count and if no violation occurs, the counter is reset. Thus, counter 164 will reach a count of ten and trigger an out of frame condition on the loss of frame driver 167 when ten consequtive violations are detected. This will illuminate a suitable indicator via buffer 168.

While in the in frame condition, every violation is gated via the buffer inverter 170 as a high going parity violation pulse. This pulse is eighteen time slots long for every violation. Once the out of frame condition has been registered, the parity violations output is inhibited and the framing circuity goes into a search mode. In this mode, a parity violation will cause counter 164 to reset and a good parity indication will cause it to count. Each time a parity violation is detected, it is assumed that the unit is incorrectly framed and the count reset control 166 gates an inhibit command pulse to a pulse narrower circuit 170. The output pulse from circuit 170 is fed to counter 158 to delay the counter by one count period. With clock pulse 1 from gate 157 delayed one period after clock pulse 3, parity bit sampler 162 contains the output of the parity counter one period later than that sampled by clock pulse 3. This information is forced onto the parity bit sampler 162 by the delayed parity gate pulse formed from control 166. Accordingly, when clock pulse 3 takes the next sample, it is comparing the present sample with the previous sample although the sample has now slipped one time slot with respect to the frame. If no parity violation occurs, the counter 164 is incremented by one.

Therefore, every time a violation occurs, counter 164 is reset so that it takes ten consecutive no violation counts to react in an in frame condition. Every time a parity violation is detected, counter 164 is forced to slip a pulse until the correct framing is achieved.

Figure 28:
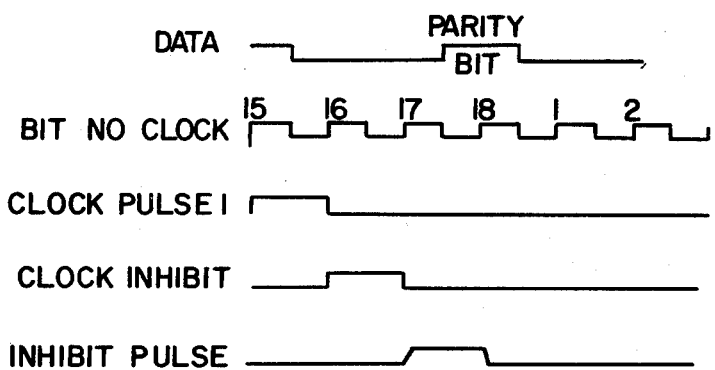
FIG. 28 is a timing diagram depicting the timing relationship in parity removal.

While in the out of frame condition, the buffer inverter 170 is prevented from gating parity violations out and its output is held low. The counter 156 must be inhibited once every eighteen time slots at the parity bit period. Clock pulse 1 accomplishes this. Since clock pulse 3 samples the parity bit, this defines the phase relationship of counter 158 with the eighteen bit frame. This timing is depicted in FIG. 28.

The parity removal circuit monitors incoming line signals for parity violations and out of frame conditions, but serves to retrieve all parity information to enable parity codes to be used for control of the automatic span switching control as above described.

PROTECTION SWITCH CONTROL (PSC 100)

As is ascertained from the above description, the protection switch control 100 is microprocessor based and operates with a stored program. The PSC 100 interfaces with a plurality of CBIs such as the service line CBI 86 and the protection line CBI 96 and communicates with the CBI. It is through this unit that the PSC can communicate with the DTO 87 and DTO 97 as well as DTI 88 and DTI 98 and the AIU 85.

As is shown in FIGS. 8 through 19, the operation of the PSC is relatively complex, but based on the above explanations and comments to follow, one skilled in the art will have no difficulties in programming a conventional microprocessor to implement such functions. Microprocessors which may be employed for the PSC are manufactured by many companies as Motorola, National Semiconductor, Zilog and others. Once the operation requirements of the unit are ascertained as above described, the implementation of the structure is relatively straightforward.

The PSC interfaces with the control bus interface or CBI and may interface with up to thirteen such units including the CBI associated with the protection line terminal. The CBI interfaces mainly with up to thirteen data transfer inputs (DTIs) and data transfer outputs (DTOs). All these units comprise the fiber protection switch (FPS) which is shown in dashed line in FIGS. 8-19.

The FPS also interfaces with the AIUs in the associated line terminals. The combined operation of the PSC, CBI, DTO, DTI and AIU units has been explained in terms of basic functions. The present discussion concerns itself with other considerations regarding the design and structure of such units.

The main function of the PSC is to monitor all alarm conditions originating from the DTO, DTI or AIU and then to initiate the appropriate operation in the form of the transmission of control signals which are directed to the DTO, DTI or AIU. All alarm and control lines which interface with the DTO and DTI are DC control levels.

The interface between the PSC and the AIU, apart from having several DC control and alarm lines, also has a serial channel which permits the transfer of information between the modules in the form of eight bit serial codes according to the format shown in FIG. 20. The PSC communicates with up to thirteen CBIs by initializing each one with a unique address and thereafter subsequently activating the desired CBI by outputting its address over a common bus. The technique of doing this is easily implemented by means of a memory which will store each address of a CBI and access such an address when a CBI is to be activated. The technique of performing such selection and addressing by means of a microprocessor is easily implemented.

After selection of a desired CBI, the PSC activates the appropriate input/output function through appropriate select lines. In this manner, control data is forwarded over a four bit bidirectional data bus. Each CBI as coupled to a PSC may be identified by its physical location in the switch which is determined electrically by a separate IDENT line tied from each CBI to the PSC. This line is used to load the CBI address at initialization. When in normal operation, the IDENT line also serves as a high speed priority interrupt which directs the PSC to the system requiring service. Such interrupts in conjunction with microprocessor techniques are also well known.

The operation of the PSC, as indicated, apart from automatic operation as described, can be manually oriented using key pad entries from an appropriate control panel. In this manner, entries can be made on a manual basis at any time to alter the mode of operation or obtain status information. In order to provide system security, access to the keyboard may only be had by entry of a pass word. The aspects of implementing microprocessor operation in conjunction with a keyboard are also well known.

In regard to the system above described, a front panel associated with the keyboard would require at least three visual indications. A first indication would be a transfer complete which provides an indication that a current request for a transfer to a protection span line has been completed. A second indication would be a transfer incomplete which would provide a visual indication that a current transfer request could not be serviced due to multiple requests or an FPS failure. A further indicator is designated as PSC fail and is a special failure mode which shows that the program has failed due to an internal failure of the PSC.

Since the PSC is the control unit for all switching functions, it is sufficient to divide its description into a control signal timing and level description as well as a switching operation, alarm and control signal sequence and system timing performance. To initialize a CBI, a unique selected four bit address is placed on the output bus by activating the read-write line of the PSC and by clocking in the address via a generator by pulsing the IDENT line.

In regard to output operations, all control signals are outputted via the CBI using this sequence. First, the appropriate CBI is addressed and the output function selected using the select lines. Valid data is then inserted on the data bus and clocked into the CBI by the clock pulse where it is latched in a register until cleared.

The PSC monitors alarm conditions and control inputs by scanning the appropriate lines. The sequence of events is the same as for output operations, except that a clocking pulse is not generated. In regard to a request from the AIU, the sequence of events in a program format are as follows:

The AIU places a request to talk on an input line to the PSC. This input is periodically polled by the PSC based on its scanning technique. Hence, the PSC will scan the thirteen request lines from the AIUs of the service line terminals. When a request is detected, the PSC transmits to the requesting AIU a ready to receive signal. The moment that this signal is received, the AIU transmits to the PSC. Serial data is transferred to the PSC over the data bus and the PSC can now respond to the AIU with serial data.

The PSC is the unit which closes down communication and hence, controls the lead to the AIU and waits ten milliseconds to insure that the AIU has completed transmission. When the AIU removes its request to talk, this closes down the transmission channel. If the PSC desires to access an AIU, it places an active on the appropriate lead. The required CBI is addressed and its request to talk lead is polled by the PSC. In the event of a CIDET signal or an XFREQ signal, this immediately causes the appropriate input line to the PSC to go active and the PSC will interrupt any program to service a transfer request.

Transfer sequences start upon detection of XFREQ or CIDET signals from the AIU, providing no higher priority claims the transfer. Upon receipt of the XFREQ signal as the first stage, the PSC is vectored to the failed system CBI and immediately causes the DTI of the failed system to transfer traffic onto the spare line in the transmit to span direction. The CBI is made to transmit out the XFERN, which causes the AIU to return code 1 which is the transfer code to the far end. It then checks XFREQ and CIDET to determine the cause of the transfer request and sets up timing loops dependent upon that result. If the failure is on the incoming direction, the PSC chooses the longer timing period to allow the far end to respond to CIDET, transfer to the spare and allow time for the spare line to settle. After this reset period, the associated CBI is made to activate the DS3 CONT which completes the transfer on the incoming direction. If the CIDET signal is received first, the sequence of events is the same, except that a shorter timing period is selected since the remote end is assumed to have already transferred its signal.

As described above in regard to the automatic reset mode, this is initiated from the end of the switch which detected in the incoming failure (XFREQ). In this mode, the PSC gains control of the serial channel by activating the ready to receive input to the AIU. When the AIU responds with the request to talk, the PSC begins to transmit code 2 of FIG. 20. This causes the AIU at the far end to activate its request to talk to alert the remote PSC for code reception. This is all done via inserting the correct code sequence into the parity circuit in order to generate code 2.

The remote PSC will respond by activating its ready to receive line, thus locking in the serial channel for bidirectional connection. The remote end replies by returning the code 2 to the original end. The originating end now has confirmation that the remote end is ready to receive and begins the reset sequence by transmitting the reset code. When the far end receives the reset code, it returns the same and at the same time, restores the traffic in the receive direction to the service line terminal. A counter is started and after a preset period, the far end removes the transferred signal from the transmit direction. At the originating end, as soon as the reset code is received, the PSC restores traffic to the service line terminal in the receive direction and removes the transferred signal from its transmit direction. This completes the reset sequence as above described. The serial channel is then closed by the originating PSC which then transmits code 3 to the remote end.

As indicated, a manual or an automatic mode can be selected from a keyboard associated with the PSC after entry of the pass word. On changing the mode, the PSC will select a working span and use the serial channel via the parity bit to signal the far end to change its mode also. In this manner, control can be excercised from either end of a span. In going from automatic to manual via the keyboard, the PSC, upon detection of the manual command, disables all high speed interrupts and will temporarily suspend all new transfers. The PSC will then select the working system to transmit the mode change to the far end and then wait for a reply. The remote end, upon receiving the mode change word, disables high speed interrupts and after a preset period, enters the manual mode. It immediately returns the manual mode set word to the originating end. This again is a code selected from FIG. 20 and is implemented via a change in parity. The originating end receives the echo mode set word and enters the manual mode. If this echo is not received, the originating end will revert to the automatic mode and send the automatic mode set word to the far end. When both ends are in the manual mode, transfer of any system to the spare can be made if the spare line is operating properly. This includes the option to preempt a failed higher priority from the spare and replace it with a lower priority system.

In going from the manual to an automatic mode via the keyboard, the PSC selects a working system to transmit the automatic mode set word to the far end. The originating PSC temporarily suspends all transfers. When the remote end receives the mode change word, it returns it to the originating end and waits a preset period of time. If no further commands are received, it will then enter the automatic mode. The originating end, on receiving the echoed mode set word, will select the automatic mode completing the mode change at both ends.

In the system, manual transfers can take place at all times, except when the spare line has failed. If a manual transfer is attempted while the spare line is failed, an incomplete indication will be given and no action taken. A request for manual transfer is made from the keypad and results in the originating end transmitting the system number of required transfers to the far end over the spare line. The originating end will immediately transfer the transmit direction of that system to the spare as shown above. Upon receiving the system number at the remote end, the PSC will immediately transfer its transmit direction to the spare and wait a preset period before completing the transfer in the receive direction. When the originating end receives the echoed system number, it will wait a preset period and then complete the transfer in the receive direction.

A manual reset is performed by transmitting a reset code word over the spare line. The remote end will echo the reset word and immediately reset the signal in the receive direction. The transmit direction continues on the spare for a period of time after which it is removed. The receive end transfers its receive direction to the main span line immediately after receiving the keyboard command. It will wait a preset period before removing the transmit direction from the spare. If no echo is received, it is assumed to be an undetected fault and the PSC will remove all keep alive signals from the spare, alarming the far end.

Under the conditions where a manual transfer is required and the system is already transferred, the new transfer must simultaneously reset the existing one. In this mode, the originating end will first reset the existing transfer in the transmit direction and transfer the new system. It will then transmit the system number of the new transfer to the far end over the span line. Upon receiving system number at the remote end, the PSC will immediately reset the existing transfer in the transmit direction and transfer the new system. It will echo the system number and wait a preset time. For this period, it will remove the old system and complete the new transfer in the receive direction. When the originating end receives the echoed system number, it waits a preset period and then removes the old system and completes the new transfer in the receive direction. This completes the reset of the old system and transfers the new system.

THE CONTROL BUS INTERFACE (CBI)

Figure 29:
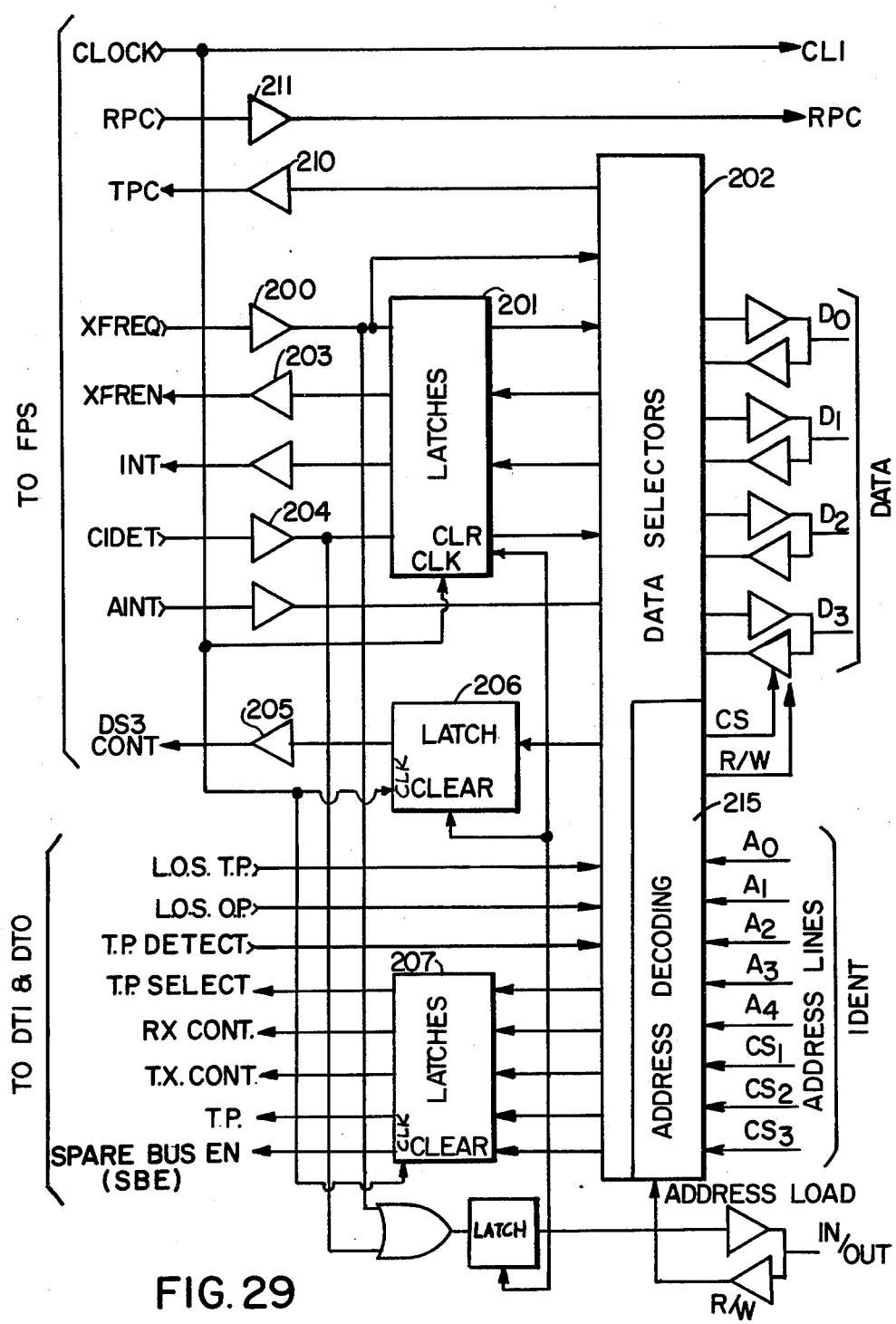
FIG. 29 is a simplified block diagram of a control bus interface (CBI) according to this invention.

As was ascertained from the above description, the CBI is used to transfer signals from the AIU to the PSC, pass alarms from the DTI and the DTO to the PSC and transfer commands from the PSC to the DTI, DTO and AIU units as required for system switching. Referring to FIG. 29, there is shown a simple block diagram of a CBI in order to clearly explain the descriptions of inputs and outputs and how the CBI operates.

As indicated above, the XFREQ is a request for transfer which originates in the AIU and remains valid as long as an alarm is present. This signal is transferred to the CBI and then to the PSC. The signal is received by a line driver 200 where it is transferred and stored in a latch circuit 201 and coupled to a data selector module 202. The XFREN is sent to the AIU via driver 203 indicating that the AIU transmits a burst of code 1 to the other end of the system. Hence, this signal comes from the data selector 202 and is applied through the latch circuit 201 to the driver 203. The code 1 detect is applied to receiver 204, latch 201 and data selector 202 and is a DC signal which is an indication from the AIU that code 1 has been received at the near end. The DS3 CONT is a signal emanating from driver 205 via latch 206 and is used by the AIU to squelch the DS3 output of the service line terminal and hence, enable the DS3 output from the associated DTO.

TX CONT is obtained via latch 207 and controls the output of the DTO. The LOS O/P indicates a failure on the DTO as coupled to the PSC. The TPC via amplifier 210 is a serial data path from the PSC to the AIU via the data bus and is an indication for the transmission of the parity code. The RPC via driver 211 is a receive parity code and is a serial data path from the AIU to the PSC.

The RX CONT which emanates from latch 207 squelches the data outputs to the main bus at the DTI. The TPI is a test pattern insert signal and informs the DTI to insert a 1010 test pattern on the main bus. The LOS I/P informs the PSC via the data bus of all ones or all zeroes condition on either rail of the main bus and/or loss of input signal from the DTI. The TPD signal indicates to the PSC that the 1010 test pattern is absent on the data inputs of the DTO. The TPS test pattern select places the test pattern on the DTO output. The SBE signal is the spare bus enable and informs the DTI to insert both the test pattern and the test pattern clock on the spare bus lines. The INT allows the PSC to use the serial transmission to the AIU and basically, this signal is the above described ready to receive signal. The AINT is an interrupt line from the AIU to the PSC and basically this signal is the AIU's request to talk. The clock CL1 is a clock pulse which clears and clocks data into the output latches as 206 and 207. The R/W puts the IDENT port in the input mode when active. The IDENT, as described above, is a hard wired bidirectional line between the CBI to the PSC which clocks the address latches as well as the latching and indicating XFREQ and/or core 1 detect to the PSC.

As indicated, each CBI is assigned a unique five bit address by the PSC as part of the initialization process. The address is latched on the CBI via inputs A0 to A4 to the address decoder 215 and employs a clock pulse from the PSC. This address is compared with the address bus to enable the CBI to recognize its own unique address. As seen, an eight bit word originates on the PSC, which word consists of the five bit address A0 to A4 for the CBI and a three bit CS1, CS2 and CS3 and three bit chip selection function. In this manner, the codes are as follows:

TABLE

| CHIP SELECTION CODE | FUNCTION |
| --- | --- |
| 0 | Clears the XFREQ CI detect and IDENT latches. |
| 1 | Enables the clock for the XFREN, INT, DS3 CONT and TX CONT latches. |

TABLE-continued

| CHIP SELECTION CODE | FUNCTION |
| --- | --- |
| 2 | Enables the clock for the TPI, RX CONT, TPS and SBE latches. |
| 3 | Allows LOS I/P and LOS O/P and alarms to be transmitted to the PSC. |
| 4 | Allows XFREQ, CIDET and AINT signals to be transmitted to the PSC. |
| 5 | Allows the PSC access to the TPC serial transmission path. |
| 6 | Allows the PSC to determine if a particular CBI is enabled via the IDENT line. |
| 7 | Since the chip select lines are normally high, this provides a clear or a no function condition. |

Hence, as seen from FIG. 29, the block diagram of the CBI in conjunction with its functions as above described, affords an extremely simple operation.

THE TRANSFER OUTPUT UNIT (DTO)

As indicated, the DTO accepts two rail NRZ from the transfer in module or DTI. The unit receives clock pulses from the DTI and operates under control of the PSC which sends two control signals via the CBI to the DTO. During normal operating conditions, the unit receives test patterns from the DTI sequentially via the main data bus and receives test patterns from the DTI via the spare data bus as well as clock signals. The DTO monitors the signal on the main data bus and provides an alarm signal to the CBI when the test pattern code is violated by incoming data. Under control of the PSC via the CBI, the DTO places main data bus traffic or spare data bus traffic on the output stage. This output stage may be turned off or on by the TX CONT received from the PSC via the CBI. The DTO routes clock through reshaping circuits to provide accurate control pulse widths. Upon failure of a service line terminal, commands will be received from the PSC via the CBI which will cause the failed traffic to be routed on main data buses and transmitted by the DTO to the protection line terminal.

In the reverse direction, the signal received from a protection line terminal will be routed through a DTI to a DTO. The DTO will transmit a proper coded signal at this point. The unit basically employs line receiver amplifiers in a single ended mode to receive and amplify clock and two rail data signals from the buses to proper logic levels. In this manner, the unit uses OR/AND gates to route main and spare clock and data signals under control of the test pattern select signal received from the PSC via the CBI.

The implementation of the DTO is relatively simple. When the TPS signal is low, the main bus clock is routed directly to retiming flip/flops and the 101010 test pattern detector. The spare bus clock is routed to reshaping circuits. The reshape clock is routed to spare data retiming flip/flops and an NRZ to RZ converter. The reclocked spare bus data is routed to the NRZ to RZ code converter and to an output stage. When the TPS signal is high, the main bus clock is routed to a reshaping circuit and this clock is routed to main data retiming flip/flops, to the NRZ to RZ code converter and the 101010 pattern detector. The spare bus clock is routed directly to spare data retiming flip/flops, while the reclocked main bus data is routed to the NRZ to RZ code converter and on to the output stage.

Accordingly, without giving exact details of circuit construction, it is well known to perform clock reshaping in order to permit the DTO to develop stable, well-defined output pulses. NRZ to RZ code conversion is also well known and can be implemented by NOR/OR gates using clock and data as inputs.

The output stage is implemented by two identical constant current differential amplifiers, where each amplifier pair is driven by a set of complementary outputs of the NRZ/RZ code converter to implement a rail of data received from the data bus. The constant current source used to drive the output stages are operational amplifier sources and the TX CONT signal received from the PSC via the CBI is interfaced with the source to squelch the output by turning off the current to the differential amplifier.

The unit is equipped with a test pattern detector which monitors the returned main data bus signals. The output of this detector is converted to a compatible logic level which is at a high value when the test pattern is reset. This is also a conventional circuit. The DTO is equipped with a loss of signal detector where the output of this detector is high for no signal loss and essentially the DTO performs the functions as indicated in FIGS. 8 through 19.

THE TRANSFER IN INPUT CIRCUIT (DTI)

The DTI accepts a standard signal from the multiplexer or a line terminal via a hybrid and provides two rail NRZ outputs and clocks. The DTI also has a test pattern (101010) generator which may be switched on to the two rail bus. Interface driver circuitry is provided in the unit to place the test pattern and clock on the spare two rail bus and the spare clock bus. The unit is controlled by three control sequences from the CBI which is the test pattern insert TPI, the receive control spare bus enable (SBE) and the unit provides an alarm if there is a failure of the input signal or if there is an all one or all zero condition on the output of the retiming circuitry.

The DTI accepts a signal from a multiplexer or a line terminal and has an amplifier with AGC allowing this signal to be driven at a constant level regardless of the length of line coupling the DTI. The DTI has a clock recovery circuit where positive and negative going pulses are combined to drive a tank circuit. This clock recovery circuit is conventional and a signal from an LC tank is fed to an amplifier via a high impedance boot-strapped emitter follower circuit. The output of the clock recovery circuit is used for retiming the incoming data, generation of the test pattern and bussing to other modules. The signal is retimed by the recovered clock and converted to two rail NRZ data by the use of conventional D type of flip/flops. A test pattern generator uses the derived clock to generate the test pattern signal and this signal is switched to the main data bus or the spare data bus as required. The data/test pattern selector is controlled by the TPI signal received from the CBI and this signal is used to sequentially place the test pattern signals on the DTIs as controlled by the PSC.

The DTI uses bus drivers for the two rail data bus and the clock bus. These drivers are controlled by the receive control signal received from the CBI. The unit uses bus drivers for the two rail spare data bus and clock bus. These drivers are controlled by the spare bus enable signal (SBE) received from the CBI. The unit provides an alarm signal upon the loss of input signal or loss of activity at the output of the retiming circuitry The absence of this alarm indicates that the input signal is being received and that the clock recovery and retiming circuits are operating normally.

Hence, the above described system is operative to automatic protection switching which incorporates a plurality of service lines and at least one protection line. The parity violation control operates to insert parity violations in a parity insertion circuit associated with a serivce line terminal. Insertion of parity according to an algorithm allows thirty-two codes to be used for control of the automatic protection system to enable near and far end terminals to communicate with one another.

The particular application described is employed for a binary transmission system which uses bit addition for error detection purposes. The parity violation code can also be used as a remote reporting channel so that codes can be sent from distant offices to a central location to provide indication of various alarm conditions at a remote location. The system is completely suitable for high speed digital systems such as those employing optical fibers and provides a low frequency control interface suitable for microprocessor control, while avoiding the use of high power, high speed control circuitry.

By the use of parity violation control, both protective switching and remote reporting schemes are possible. In this manner, the system can employ an eight bit code word to define up to thirty-two codes or commands and to use a portion of such commands as valid code designations to afford automatic protection switching as above described.

I claim:

1. Automatic protection apparatus for a telecommunications system including at least one service line terminal associated with a service line and at least one protection line terminal associated with a protection line, with said service and protection lines extending between a near telecommunications office to a far telecommunications office for transmitting between said offices digital data indicative of information, with said data as transmitted comprising a number of successive data frames, wherein each frame has a plurality of data bits and at least one parity bit indicative of the count of said data bits being even or odd, comprising:

monitoring means for sensing a failure of service line between said near and far offices;

parity code inserting means coupled to said monitoring means and operative to modify said parity bit from frame to frame to indicate said failure;

switching means responsive to said frames of data as modified in parity by said code inserting means for transferring at said near and far end said telecommunications service line to said protection line upon sensing said failure according to said parity bit modification; and control generation means coupled to said parity code inserting means for further modifying said parity bit as transmitted to enable said near and far end to communicate to provide indications necessary to fully complete said transfer.

2. In a telecommunications system including a plurality of service span lines connected in series relationship between a near end office and a far end office to afford communication between said offices via a digital data signal transmitted on said lines, with said signal comprising a given number of data bits per frame, with at least one parity bit indicative of the count of said data bits as being even or odd, comprising:

a protection switch control unit at each end of said span line and a line service terminal at each end of said span line coupled to said associated protection switch control unit, said service terminal including parity insertion means for modifying said parity bit on a frame to frame basis;

means responsive to a failure of said service line and coupled to said line service terminal to modify said parity bit for transmission of a code over said service line indicative of a line failure; and logic means coupled to said protection switch control unit to transfer said failed line at both said near and far end following the occurrence of said failure.

3. The telecommunications system according to claim 2 wherein a frame of said digital data signal contains eighteen bits wherein the eighteenth bit is a parity bits, with the remaining bits being data bits.

4. The telecommunications system according to claim 3 wherein said means for modifying said parity bit is on a frame to frame basis to enable generation of at least thirty-two codes each of an eight bit code word, transmitting at least one of said codes out of said thirty-two codes to indicate service line failure.

5. The telecommunications system according to claim 2 wherein said service span lines are optical fibers having impressed thereon optical data manifesting said digital data.

6. The telecommunications system according to claim 2 wherein each of said service line terminals further includes parity removal means responsive to said parity bit content of said digital signal for responding thereto, and means for detecting a code carried by said bits manifesting said service span line failure.

7. The telecommunications system according to claim 2 wherein either said near or far end office can detect said failure and hence modify said parity bit content.

8. The telecommunications system according to claim 2 wherein each of said service lines has assigned thereto a particular priority and priority detecting means included in said protection switch control unit for affording transfer to a higher priority span line when a failure occurs in at least two different priority span lines.

9. An automatic protection apparatus for a telephone system of the type including at least one service line terminal associated with a service line and at least one protection line terminal associated with a protection line, with said service and protection lines extending between a near and a far central office for transmitting digital data therebetween, with said data as transmitted comprising a number of sucesssive data frames, wherein each frame has a predetermined number of data bits and at least one parity bit indicative of the count of said data bits in said frame being odd or even, comprising:

a first alarm interface unit coupled to said service line terminal and operative to monitor said service line to detect a failure;

a second alarm interface unit coupled to said protection line terminal and operative to monitor said protection line to detect a failure;

a service line control bus coupled to said first alarm interface unit for providing a plurality of data output lines;

a protection line control bus coupled to said second alarm interface unit to provide a plurality of data output lines;

protection switch control means coupled to one of said data output lines from each of said service and protection line buses to allow said first and second alarm interface units to communicate with said protection switch control means, said protection switch control means modifying said parity bits for communicating with said far end terminal connected to said service line;

first data transfer input means associated with said service line and having an input coupled to another output data line from said service line bus and an input coupled to a transmit side of said service line;

first data transfer output means associated with said service line and having one input coupled to said service line bus and an output coupled to said receive side of said service line;

second data transfer input means associated with said protection line and having one input coupled to said protection line bus and an output coupled to said first data output associated with said service line, and an input coupled to said receive side of said protection line, second data transfer output means associated with said protection line and having one input coupled to said protection line bus and an output coupled to the transmit side of said protection line;

a data bus coupled between said first data transfer input means and said second data transfer output means;

whereby upon detection of a failure by said first alarm interface unit said protection switch control operates to connect the transmit side of said service line to the transmit side of said protection line via said first data transfer input means and said second data transfer output means and to connect said receive side of said service line to said receive side of said protection line via said second data transfer input means and said first data transfer output means.

10. The automatic protection apparatus according to claim 9 wherein said protection switch control means as coupled to said service line terminal includes means for modifying said parity bits to transmit via said service line a modified parity bit signal indicative of said failure and necessary to communicate the same to said far end terminal connected to said service line.

11. The automatic protection control apparatus according to claim 9 wherein said protection switch control means provides a control signal to said second data transfer output means associated with said protection line indicative of a "keep alive" signal indicating that said protection line is available for transfer.

12. The automatic protection control apparatus according to claim 9 wherein said first alarm interface unit upon detecting a failure provides a transfer request signal to said protection switch control means via said service line control bus.

13. The automatic protection control apparatus according to claim 12 wherein said protection control system responsive to said transfer request signal provides an enable signal to said first alarm interface to enable said first alarm interface as coupled to said service line terminal to cause a parity code signal to be transmitted on the transmit side of said service line, to notify said far end of said failure.

14. The automatic control apparatus according to claim 13 wherein
said parity code signal is a selected one out of thirty-two cyclical parity codes each having eight bits.

15. The automatic control apparatus according to claim 14 wherein
said protection switch control means provides a receive control signal to said service line control bus for latching said first data transfer input means onto said data bus coupled to said second data transfer output means.

16. The automatic control apparatus according to claim 15 wherein
said protection switch control means provides said protection line control bus with a receive control signal which latches said data transfer input means associated with said protection line onto said data bus.

17. The automatic control apparatus according to claim 16 wherein
said protection switch control means provides said protection control bus with a transmit control signal to latch said protection line data transfer output means onto said protection line transmit side.

18. The automatic control apparatus according to claim 17 wherein
said protection switch control means inhibits said service line terminal in the transmit direction to allow transmit data transmission through said protection line terminal.

19. The automatic control apparatus according to claim 18 wherein
said protection switch control means inhibits said service line terminal in the receive direction to allow receive data transmission through said protection line terminal.

20. The automatic control apparatus according to claim 9 further including
keyboard means coupled to said protection switch control means to manually cause said means to transfer one of said service lines to said protection line.

21. The automatic control apparatus according to claim 9 wherein
said service line and said protection line are optical fibers.

22. A method of providing a control code for use in communicating control information from a near end telecommunication location to a far end location which locations are in communication via a digital transmission line, carrying digital data, encompassing a plurality of sequential data frames each having a predetermined number of binary bits, with at least one bit in each frame indicative of a parity bit for conventionally determining whether ones of said data bits in said frame are even in number or odd in number, comprising the steps of:
intentionally modifying said parity bit in successive frames to provide cyclical codes each code manifesting a separate control status;
responding to said parity bit as modified to provide said code to enable performing a control function as specified by said code.

23. The method according to claim 22 further including
switching a back-up transmission line between said near end telecommunications location and said far end location upon responding to one of said codes.

24. The method according to claim 22 wherein
said digital data frame comprises eighteen bits, with the eighteenth bit being said parity bit, selecting said eighteenth bit, modifying said bit in successive frames to provide thirty-two unique eight bit codes.

* * * * *